(12) United States Patent
Andreescu et al.

(10) Patent No.: US 10,179,732 B2
(45) Date of Patent: Jan. 15, 2019

(54) FUNCTIONAL PLATFORM FOR RAPID CAPTURE AND REMOVAL OF NANOPARTICLES

(71) Applicants: Emanuela Silvana Andreescu, Potsdam, NY (US); Ali Othman, Potsdam, NY (US)

(72) Inventors: Emanuela Silvana Andreescu, Potsdam, NY (US); Ali Othman, Potsdam, NY (US)

(73) Assignee: Clarkson University, Potsdam, NY (US)

(*) Notice: Subject to any disclaimer, the term of this patent is extended or adjusted under 35 U.S.C. 154(b) by 3 days.

(21) Appl. No.: 15/657,905

(22) Filed: Jul. 24, 2017

(65) Prior Publication Data

US 2018/0022604 A1 Jan. 25, 2018

Related U.S. Application Data

(60) Provisional application No. 62/365,636, filed on Jul. 22, 2016.

(51) Int. Cl.

| | |
|---|---|
| *G01N 33/58* | (2006.01) |
| *B82Y 40/00* | (2011.01) |
| *B22F 1/00* | (2006.01) |
| *B01J 23/10* | (2006.01) |
| *B01J 21/04* | (2006.01) |
| *B01J 21/06* | (2006.01) |
| *B01J 21/08* | (2006.01) |
| *B01J 23/06* | (2006.01) |
| *B01J 23/18* | (2006.01) |
| *B01J 23/72* | (2006.01) |
| *B01J 23/745* | (2006.01) |
| *B01J 35/00* | (2006.01) |
| *C02F 101/20* | (2006.01) |
| *C02F 103/34* | (2006.01) |
| *C02F 103/06* | (2006.01) |
| *C02F 103/16* | (2006.01) |
| *B82Y 99/00* | (2011.01) |
| *C02F 103/00* | (2006.01) |

(52) U.S. Cl.
CPC .............. *B82Y 40/00* (2013.01); *B01J 21/04* (2013.01); *B01J 21/063* (2013.01); *B01J 21/066* (2013.01); *B01J 21/08* (2013.01); *B01J 23/06* (2013.01); *B01J 23/10* (2013.01); *B01J 23/18* (2013.01); *B01J 23/72* (2013.01); *B01J 23/745* (2013.01); *B01J 35/002* (2013.01); *B01J 35/0013* (2013.01); *B22F 1/0025* (2013.01); *B82Y 99/00* (2013.01); *C02F 2101/20* (2013.01); *C02F 2103/007* (2013.01); *C02F 2103/06* (2013.01); *C02F 2103/16* (2013.01); *C02F 2103/346* (2013.01); *C02F 2209/105* (2013.01); *C02F 2305/08* (2013.01)

(58) Field of Classification Search
CPC ...... G01N 33/58; G01N 33/587; B82Y 40/00; B01J 23/10; B22F 1/0025
USPC .......................................... 502/304; 436/501
See application file for complete search history.

(56) References Cited

U.S. PATENT DOCUMENTS

| | | | | |
|---|---|---|---|---|
| 2009/0155173 A1* | 6/2009 | Scherman | .......... | A61K 49/0067 424/9.1 |
| 2014/0194314 A1* | 7/2014 | Walsworth | ......... | G01N 23/2254 506/9 |
| 2016/0076086 A1* | 3/2016 | Vo-Dinh | .............. | C12Q 1/6825 424/490 |
| 2017/0038326 A1* | 2/2017 | Motayed | ............ | G01N 33/0037 |

* cited by examiner

*Primary Examiner* — Edward M Johnson
(74) *Attorney, Agent, or Firm* — George R. McGuire; Blaine T. Bettinger; Bond Schoeneck & King, PLLC

(57) ABSTRACT

Device, method, and system for nanoparticle capture, tracking, and/or detection. A functional paper-based platform is modified with capture ligands to create binding sites for nanoparticles. According to an embodiment, nanoparticle binding produces visual images of the particle content and distribution on the modified sensing surface, which provides capabilities for both NP sequestration and real-time detection. According to an embodiment the system may be utilized for environmental decontamination, fabrication of personal protective equipment, field monitoring, and epidemiological studies. The availability of inexpensive and easy-to-use quantitative methods can facilitate rapid assessment and measurement of NPs concentration and the level of exposure for large scale toxicological and epidemiological testing.

22 Claims, 23 Drawing Sheets

FUNCTIONAL PLATFORM FOR RAPID CAPTURE AND REMOVAL OF NANOPARTICLES

CROSS-REFERENCE TO RELATED APPLICATION

This application claims priority to U.S. Patent Application Ser. No. 62/365,636, now allowed, filed on Jul. 22, 2016, and entitled "Method and Device for Capture, Removal and Detection of Metal Oxide Nanoparticles," the entire disclosure of which is incorporated herein by reference.

GOVERNMENT LICENSE RIGHTS

This invention was made with government support under Grant No. 1561491 awarded by National Science Foundation. The government has certain rights in the invention.

FIELD OF THE INVENTION

The present disclosure is directed generally to methods and systems for capturing nanoparticles.

BACKGROUND

The rapid development of nanotechnology has generated considerable increase in the manufacture and use of engineered nanoparticles (NPs) in a large variety of applications and consumer products. While NPs have enabled unique technological developments, their large-scale use has also led to increased incidence of release in the environment. Studies dealing with the health and safety implications of engineered nanomaterials have raised concerns over the toxicity of the released NPs, as well as their distribution, concentration, fate and transport.

For example, in a recent report released by the Working Party on Manufactured Nanomaterials, $CeO_2$ has been listed as one of the engineered NPs with relevance in the workplace. In the industrial sector, $CeO_2$ NPs are widely used as a polishing abrasive in the chemical mechanical planarization process (CMP) in the manufacturing of printed circuits by the semiconductor industry and as a fuel additive in diesel particulate filters by the automotive industry. Therefore, $CeO_2$ NPs are released and can be found into the environment particularly in heavy traffic and in semiconducting manufacturing areas. According to a Health Effect Institute (HEI) report, emissions of $CeO_2$ were expected to reach a level of 22 million pounds annually in the European Union resulting from $CeO_2$ use as a diesel engine additive. Recent literature regarding the health effects of $CeO_2$ NP exposure indicates that the size, oxidation state, and concentration of $CeO_2$ NPs can influence the various transformations that determine environmental and biological impact, and support the practice of minimizing concentrations in waste and water treatment facilities.

Despite the large presence of NPs, methods enabling their separation, capture and tracking are limited. Functional materials and devices that are able to collect and quantify the concentration and size distribution of NPs in real time can contribute to the development of technology that can address these critical challenges. The ideal NP tracking system is one that is easy to manufacture, inexpensive enough to be used in large scale applications and that can efficiently capture and detect NPs, making it suitable for field measurements. Such measurements are critical for evaluating concentration, distribution and effects of NPs for environmental, clinical, epidemiological and occupational exposure studies.

Traditional methodologies to characterize NPs such as transmission electron microscopy (TEM), scanning electron microscopy (SEM) and atomic force microscopy (AFM) are expensive, time consuming and cannot be used in the field. Several recent works dealing with the development of rapid methods for NP detection proposed the use of organic dyes to identify metal and metal oxide NPs in colloidal dispersions. Determination of size and concentration of Au NPs was also demonstrated by using fast scan cyclic voltammetry with liquid chromatography separation[7] and by UV-Vis spectra in conjunction with theoretical simulation. Citrate-stabilized Au and Ag NPs were measured in drinking water using acid-base indicators. Color based detection by monitoring the catalytic activity of NPs using a soluble organic dye, methylene blue, and a reducing agent, sodium borohydride was employed to measure NPs in biological and environmental samples. The method was demonstrated for different types of colloidal NPs and showed color responses to both metallic and metal oxides. Therefore, the method is not specific to the NP characteristics, such as composition, size, concentration, and reactivity. Recently, the single-particle inductively coupled plasma mass spectrometry (ICP-MS) technique received considerable attention as a method to identify and determine the concentration of nanoengineered materials in water samples, including $CeO_2$ NPs. This procedure is very sensitive but requires high cost instrumentation, trained personnel and has limited availability.

Accordingly, there is a continued need in the art for inexpensive and easy-to-use quantitative methods and systems to facilitate rapid capture, assessment, and/or measurement of nanoparticles (NPs).

SUMMARY OF THE INVENTION

The present disclosure is directed to a device, method, and system for nanoparticle capture, tracking, and/or detection. A functional platform is modified with capture ligands to create binding sites for nanoparticles. The platform can be cellulosic fiber (e.g. paper) or other types of natural or synthetic materials including but not limited to silk, cotton, wool, linen, nylon, rayon, and/or polyester, in addition to other fibers or compounds. According to an embodiment, nanoparticle binding produces visual images of the particle content and distribution on the functional surface, which provides capabilities for both NP sequestration and detection. According to an embodiment the system may be utilized for environmental decontamination, fabrication of personal protective equipment, field monitoring, and epidemiological studies. The availability of inexpensive and easy-to-use quantitative methods can facilitate rapid assessment and measurement of NPs concentration and the level of exposure for large scale toxicological and epidemiological testing.

As just one example, the system or method may be utilized for the capture, sequestration, and/or quantitative detection of $CeO_2$ NPs in a single step. The platform utilizes the ability of these NPs to react and form stable charge transfer complexes with readily oxidizable ligands with o-dihydroxy functionalities such as catechol and ascorbic acid. The straightforward operation and the low cost of this method provide opportunities for implementation of this technology for field measurements of $CeO_2$ NPs.

According to an aspect is a sensor for detecting a presence of nanoparticles, comprising: a platform; and a plurality of ligand molecules attached to the platform, wherein the ligand is selected such that binding of a nanoparticle to a ligand molecule oxidizes the ligand and produces a color change; wherein the color change indicates a presence of nanoparticles.

According to an embodiment, the platform is a paper-based platform. According to an embodiment, the paper-based platform is cellulose. According to an embodiment, the platform comprises one or more of silk, cotton, wool, linen, nylon, rayon, and polyester.

According to an embodiment, the plurality of ligand molecules comprises a catechol molecule. According to an embodiment, the plurality of ligand molecules is selected from the group consisting of caffeic acid, dopamine, and 3,4 dihydroxyphenylacetic acid.

According to an embodiment, each of the plurality of ligand molecules comprises a hydroxyl functionality, and the platform is OH-rich, and the plurality of ligand molecules are attached to the platform via interaction between the hydroxyl functionality of the ligand molecules and the OH of the platform.

According to an embodiment, the plurality of ligand molecules are attached to the platform by hydrogen bonding and/or charge interactions.

According to an embodiment, the nanoparticles comprise a metal oxide. According to an embodiment, the metal oxide is selected from the group consisting of $CeO_2$, $SiO_2$, $Fe_2O_3$, Sb2O3, ZnO, $ZrO_2$, and $TiO_2$.

According to an embodiment, the sensor is further configured such that the amount of color change quantifies a concentration of detected nanoparticles. According to an embodiment, the sensor is configured to detect nanoparticles in the environment.

According to an embodiment, the sensor includes a second plurality of ligand molecules attached to the platform, wherein the second plurality is different than the plurality of ligand molecules, and further wherein each plurality of ligand molecules is configured to selectively bind a type of nanoparticle.

According to an aspect is a sensor for detecting a presence of nanoparticles, the sensor comprising: a wearable item comprising a plurality of threads; and a plurality of ligand molecules attached to at least some of the plurality of threads, wherein the ligand is selected such that binding of a nanoparticle to a ligand molecule oxidizes the ligand and produces a color change; wherein a color change indicates a presence of nanoparticles.

According to an aspect is a system for selectively filtering nanoparticles, the system comprising: a wearable item comprising a plurality of threads; and a plurality of ligand molecules attached to at least some of the plurality of threads, wherein the ligand is selected such that binding of a nanoparticle to a ligand molecule oxidizes the ligand and produces a color change; wherein a color change indicates a presence of nanoparticles.

According to an embodiment, the plurality of threads comprise one or more of silk, cotton, wool, linen, nylon, rayon, and polyester.

According to an aspect is a system for capturing and removing nanoparticles from a surface. The system comprises a fabric platform modified with: (i) a ligand having o-dihydroxy functionalities; (ii) ascorbic acid; and/or (iii) catechol, wherein the fabric platform is configured such that wiping the surface with the platform binds nanoparticles on the surface to the modified fabric via the ascorbic acid or catechol.

According to an aspect is a disposable respiratory protective mask configured to minimize a worker's exposure to environmental nanoparticles. The mask comprises a platform modified with: (i) a ligand having o-dihydroxy functionalities; (ii) ascorbic acid; and/or (iii) catechol, wherein the platform is configured such that exposure to environmental nanoparticles causes the nanoparticles to bind to the modified platform via the ascorbic acid or catechol.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings.

DETAILED DESCRIPTION

Figure 1A:
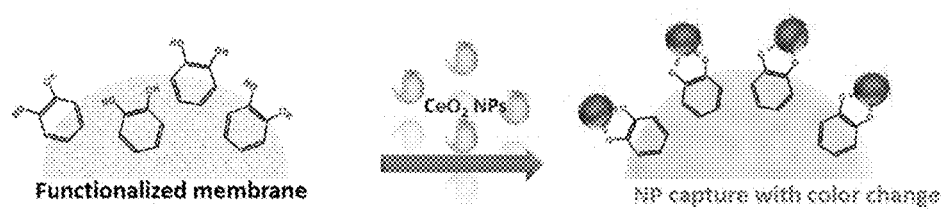
FIG. 1A is a schematic representation of a paper-based platform design and capture mechanism for sequestration and tracking of NPs, in accordance with an embodiment.

According to an embodiment is a device, method, and system using multifunctional ligands as receptors for capture, sequestration, and/or tracking of NPs. According to an embodiment, the method is based on the interaction between the NPs and surface-confined ligands that have reactivity and binding ability for NPs. This interaction generates concentration-dependent changes in the optical properties of the ligand/NPs by means of redox, interphase complexation and formation of charge transfer complexes.

According to an embodiment, the method utilizes catechol and ascorbic acid as ligands, the platform can be engineered using other types of catechol-containing molecules such as caffeic acid, dopamine and 3,4 dihydroxyphenylacetic acid. The straightforward fabrication procedure involving direct formation of capture sites through hydrogen bonding allows easy manufacturing of such platforms. Scalable fabrication is demonstrated by dot printing techniques. In addition to cellulose, other types of fibers that have the capabilities to form hydrogen bonds with the capture ligands can be used. The method demonstrates performance for detection of different types of $CeO_2$ NPs and can be used to assess distribution of their concentration in various environments. The method reveals good sensitivity with detectable concentrations in the $10^{11}$ NP/mL range and excellent reproducibility.

According to an embodiment, the method and system shows good sensitivity with detectable concentrations in the ppb range, and selectivity over a broad variety of metal oxide NPs (e.g., $SiO_2$, $Fe_2O_3$, $Sb_2O_3$, $ZnO$, $ZrO_2$, and $TiO_2$) tested in the same conditions in an aqueous environment. In addition to paper, this approach could be utilized with platforms such as silica, thread and plastic for applications as wearable devices or protective equipment for occupational exposure studies. For example, the platform may comprise one or more of silk, cotton, wool, linen, nylon, rayon, polyester, and other suitable compounds. Additional applications including platforms for selective retention and separation of NPs and portable analytical devices for detection and differentiation of metal oxides based on differences in redox properties and surface functionality can be envisioned.

According to an embodiment, the method is utilized to engineer portable tools to determine NPs and understand the mechanism of NPs in the environment. The main advantage of the method is the ease of use and the ability to inexpensively screen large number of samples. Several applications can be envisioned such as: i) platforms for selective retention and separation of NPs, ii) portable sensors for measuring presence of NPs in environmental, food or biological samples and for screening and reactivity evaluation of metal oxides based on differences in redox properties, iii) multifunctional materials for creating personal protective equipment and for devices for assessing workers exposure in occupational exposure studies.

EXAMPLE 1—$CeO_2$ Nanoparticle Capture

Figure 1B:
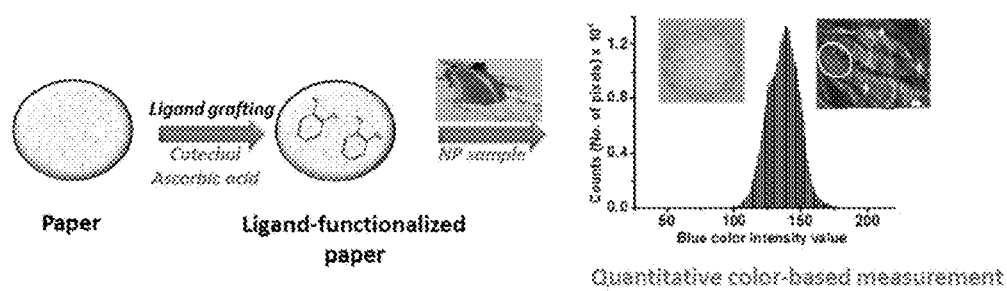
FIG. 1B is a schematic representation of fabrication and measurement/capture steps, in accordance with an embodiment.

The functioning principle of the $CeO_2$ NP tracking is shown in FIGS. 1A and 1B. According to an embodiment, in FIG. 1A is shown the concept of paper-based platform design and capture mechanism for sequestration and tracking of NPs. The paper was first functionalized with organic molecules (e.g. CT) and then employed for detection of $CeO_2$ NPs as an example. In FIG. 1B are the following fabrication and measurement steps: 1) ligand grafting through H-bonding and adsorption to the filter paper, 2) exposure to samples containing NPs and 3) color measurement and analysis.

The method is based on multivalent binding, surface retention and formation of charge transfer complexes between the NP and surface adsorbed ligands. $CeO_2$ NPs have been reported to posses oxidase-like activity and participate in redox reactions, primarily due to the presence of a dual oxidation state at their surface ($Ce^{3+}$ and $Ce^{4+}$). It is known that metal oxide surfaces bind catechol group molecules through a surface chelation mechanism involving bonding between the hydroxyl groups of the catechol and the metal ions at the NPs surface. While the physical adsorption takes place non-specifically for different types of NPs, in the case of $CeO_2$ NPs, the adsorption process is accompanied by a redox reaction in which $CeO_2$ oxidizes the catecholic ligands to their respective quinones that further generate strongly absorbing charge transfer complexes with Ce ions with high color intensity in the visible region. The reaction mechanism between catechol and $Ce^{4+}$ ions in solution was previously studied. In basic media the reaction takes place with the formation of a red cerium(IV) tetrakis (catecholato) complex with a 4-site symmetry group and a maximum absorbance at ~500 nm. In acidic solution, catechol can be oxidised to semiquinone by $Ce^{4+}$ according with Equation 1:

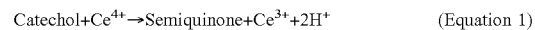

$$\text{Catechol} + Ce^{4+} \rightarrow \text{Semiquinone} + Ce^{3+} + 2H^+ \quad \text{(Equation 1)}$$

The mechanism involves the formation of a Ce(IV)-catecholate complex followed by slow reduction to $Ce^{3+}$. Formation of Ce-complexes was also demonstrated with glutamic acid or alcohol. The combined surface adsorption/oxidation process involves formation of $Ce^{3+}$ complexes as intermediates, which are characterized by a lower redox potential than $Ce^{3+}/Ce^{4+}$. Both ascorbate and catechol can easily participate in oxidation processes with cerium ions with formation of radical intermediates. When NPs are present, the intermediates (ascorbyl or semiquinone) can transfer the charge to an electron acceptor present onto the particle surface, either an oxygen vacancy in the lattice, or the $Ce^{3+}$ and form $Ce^{3+}$ complexes via charge transfer reactions.

The ability of $CeO_2$ NPs to react with organic compounds such as ascorbic acid and o-dihydroxyphenols like dopamine and catechol was utilized to fabricate the functional membrane. Ascorbic acid and catechol were selected as model reactive ligands to develop this method due to their high reactivity and binding affinity for ceria surfaces. The capture ligands are deposited on porous cellulose filter paper through hydrogen bonding and charge interactions. Interface complexation and formation of charge transfer complexes of characteristic absorption in the visible range generated between the surface-confined ligand and the NPs enabled rapid capture and quantitative assessment of the distribution and amount of these particles. Membranes with integrated capture and tracking capabilities can be used for separation and field measurements of NPs. These platforms can add to the arsenal of paper-based technologies that have been reported as an inexpensive and easy-to-use alternative to conventional instrumentation for point-of-use environmental monitoring applications.

Characterization of Reactivity and Binding Characteristics.

Figure 2:
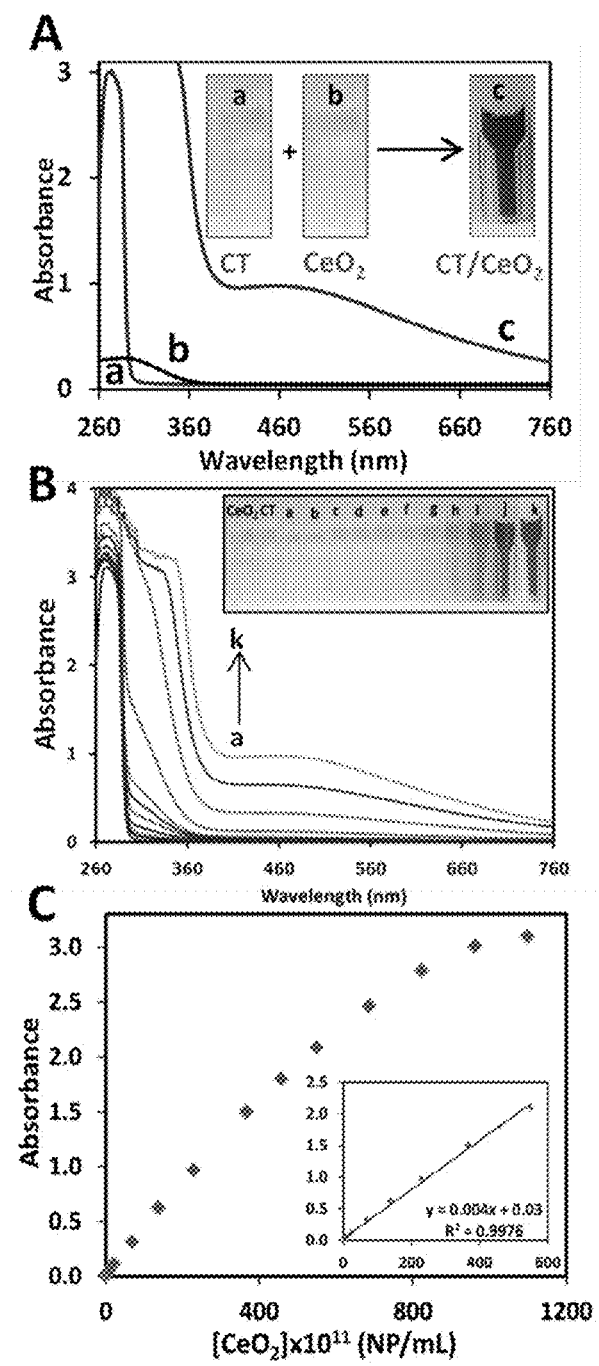
FIG. 2 is UV-Vis spectra of catechol in absence and presence of varying concentrations of NPs, in accordance with an embodiment.

To demonstrate the surface binding/detection mechanism, spectroscopic measurements were first performed to study the interaction between metal oxide NPs and the two proposed ligands. FIG. 2 shows the UV-Vis spectra of catechol in absence and presence of varying concentrations of NPs.

According to an embodiment, panel A of FIG. 2 shows the spectroscopic responses and UV-Vis spectra of 5 mM CT solution (pH 5) in the absence (a) and in the presence (c) of $CeO_2$ NPs dispersion (b). According to an embodiment, panel B of FIG. 2 shows concentration dependent spectral changes with increasing the NPs concentration (from a to k: (0.46, 0.57, 1.14, 2.28, 4.6, 6.9, 9.2, 22.9, 68.7, 137.4 and 229)$\times 10^{11}$ NP/mL)). According to an embodiment, panel C of FIG. 2 shows the linear range (0.46$\times 10^{11}$-5.5$\times 10^{13}$) NP/mL recorded at $\lambda_{max}$=460 nm. Error bars represent standard deviations for n=3 measurements.

Figure 3:
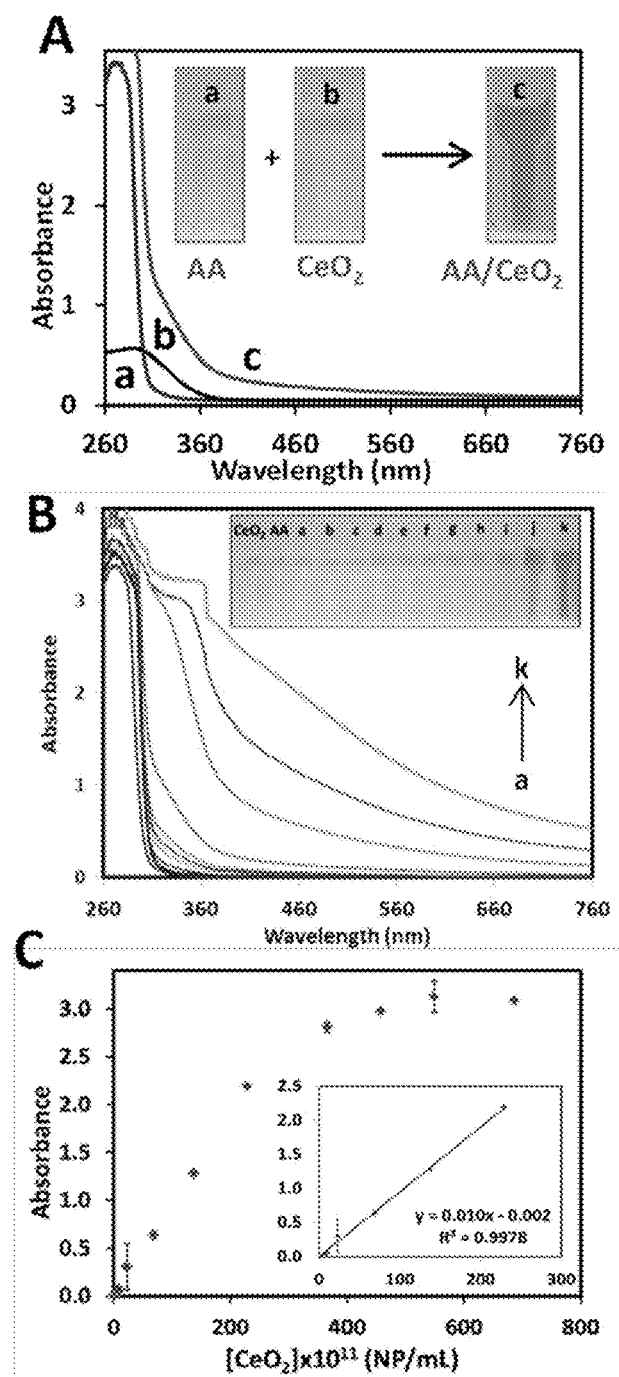
FIG. 3 is spectroscopic responses and UV-Vis spectra, in accordance with an embodiment.

The addition of $CeO_2$ NPs to catechol induced a strong and almost instantaneous color change of the ligand solution from colorless to dark brown. Absorption spectra of catechol and $CeO_2$ NP show distinctive peaks a maximum at 270 and 300 nm, respectively. When $CeO_2$ NP dispersion was added to a solution of catechol, a strong red shift in the absorption spectra and the appearance of a new peak in the visible region with a maximum at ~460 nm were observed. This new peak increases with increasing the NPs concentration and suggests formation of a metal-catecholate compound characterized by strong absorbance in the visible region (400-700 nm). A similar trend was observed for ascorbic acid which formed a complex with an orange color and a maximum absorbance at 435 nm, as shown in FIG. 3. These results indicate strong interaction between the two ligands and $CeO_2$ which can be attributed to oxidation followed by surface binding. The shift can be attributed to excitation of electrons from the organic ligand into the conduction band of the semiconductor NPs. The spectral changes are concentration dependent and suggest that this principle can be used to quantify $CeO_2$ NPs. The concentration range of NPs in colloidal dispersions that can be determined using this method is (0.46$\times 10^{11}$-5.5$\times 10^{13}$) NP/mL, with detection limits of 0.36$\times 10^{11}$ and 1.0$\times 10^{11}$ NP/mL for catechol and ascorbic acid, respectively.

Figure 4:
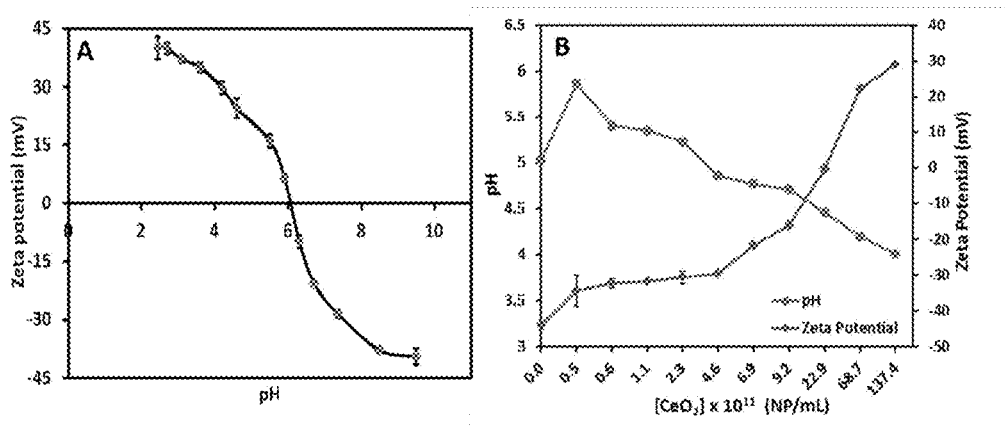
FIG. 4 shows the effect of pH on the $\zeta$-potential of the CeO2 NPs in an aqueous solution, in accordance with an embodiment.

These interactions were further studied using HRTEM, DLS and ζ-potential analysis, ATR-FTIR, powder XRD, XPS, TGA, and Raman spectroscopy. Bare $CeO_2$ NPs showed an average diameter of 17.6 (±0.3) nm and a ξ potential of +40.4 (±2.8) mV as determined by DLS and zeta (ξ)-potential analysis, respectively. The effect of pH on the ξ-potential of the $CeO_2$ NPs in an aqueous solution is shown in FIG. 4. The pH of the suspension was controlled by the addition of 0.1 M HCl or 0.1 M NaOH. A decrease from positive to negative ζ-potential values was observed with increasing pH in the range of 2.5-9.5. The isoelectric point $pH_{iep}$ (ζ=0) of the $CeO_2$ NPs used in optimization tests was found at a pH of 6.1. Upon exposure to catechol, the ξ-potential value significantly decreased to +19.5 (±1.7) mV. The process is pH dependent and varies with the particle concentration, as shown in FIG. 4. This indicates changes to the NP surface through deprotonation of one or two OH groups, which can be attributed to ligand binding to the particle surface generating charge transfer ligand-to-metal complexes.

Figure 5:
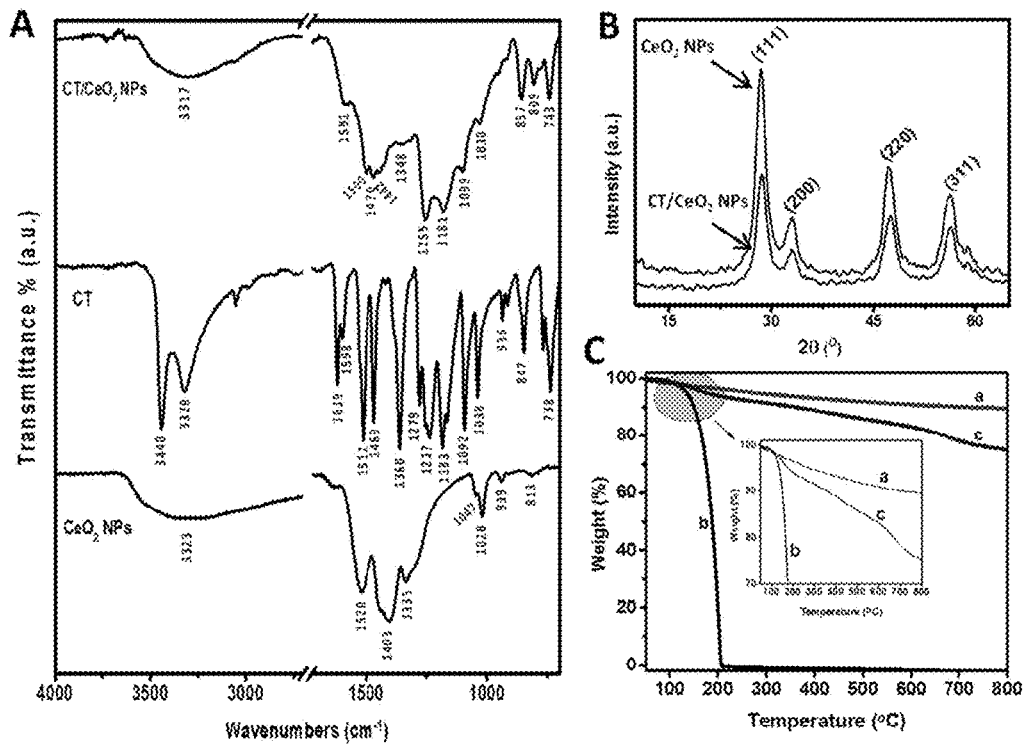
FIG. 5 shows ATR-FTIR of CeO2 NPs exposed to catechol, in accordance with an embodiment.

The binding was further confirmed by ATR-FTIR of $CeO_2$ NPs exposed to catechol, as shown in FIG. 5, which is the structural characterization of CT, bare $CeO_2$ NPs, and CT/$CeO_2$ NPs complex. Shown in panel A of FIG. 5 is ATR-FTIR spectra of bare $CeO_2$ NPs, CT and CT-$CeO_2$ NPs. Shown in panel B of FIG. 5 is XRD patterns of bare $CeO_2$ NPs and CT/$CeO_2$ NPs. Shown in panel C of FIG. 5 is TGA thermograms of (a) bare $CeO_2$ NPs, (b) CT, and (c) CT-$CeO_2$ NPs.

Bare $CeO_2$ NPs exhibit FTIR band at approximately 800 $cm^{-1}$ corresponding to the Ce—O stretching vibrations. The band at 3320 $cm^{-1}$ is due to the O—H stretching vibration of the OH groups on the Ce atom ν(Ce—OH).[44] Catechol exhibits bands at 1619, 1598, and 1512 $cm^{-1}$ corresponding to the aromatic ν(C—C and C=C) stretching vibrations. The bands at 3440 and 3320 $cm^{-1}$ correspond to the phenolic group ν(O—H) stretching vibration while the bands at 1279, 1253, and 1237 and at 1360, 1183, and 1163 $cm^{-1}$ correspond to the phenolic groups ν(C—O) stretching and δ(O—H) bending vibrations, respectively. The aromatic in-plane and out-of-plane bending δ(C—H) bands were observed at 1092 and 1038 $cm^{-1}$ and in the range of 847 to 738 $cm^{-1}$. The spectrum of the catechol/$CeO_2$ NPs sample shows broadening of the bands of phenolic δ(O—H) and ν(C—O) modes, and those of the aromatic stretching vibrations ν(C—C and C=C) and aromatic in-plane and out-of-plane bending δ(C—H). Broadening of other bands at 3320 and 936 $cm^{-1}$ was also observed. These results suggest band deformation and double deprotonation of the OH groups, ligand exchange and interphase complexation through bidentate binding onto the $CeO_2$ NPs surface.

The XRD pattern, shown in panel B of FIG. 5, of the bare particles shows diffraction peaks at 2θ=28.5°, 33.0°, 47.6°, and 56.4°, which correspond to (111), (200), (220), and (311) plane corresponding to the face cubic (fcc) structure of ceria. After exposure to catechol, the NPs retained their crystal structure. However, a slight decrease in the intensity of the diffraction peaks and a shift to higher angle is observed which may be due to surface tension and bond contraction at the NP surface[46] further confirming surface modification due to ligand binding. The presence of organic ligands onto the $CeO_2$ surface was further assessed by TGA, as shown in panel C of FIG. 5. Bare $CeO_2$ exhibits stable thermal behaviour with no significant degradation temperature. A quick weight loss is observed for catechol in the region of 150-200° C. with a thermal degradation temperature at 172° C. For the catechol-$CeO_2$ sample, the TGA curve exhibits a gradual weight loss in the region of 150-350° C. with a thermal degradation temperature at 192° C. which corresponds to thermal decomposition of the adsorbed catechol. A weight loss of ~10% was also observed between 600 and 710° C., as shown in panel C of FIG. 5. Cerium species, $Ce^{3+}$ and $Ce^{4+}$ can exist in different hydrolytic species, depending on pH. It was found that at low pH values (typically <2), the $Ce^{3+}$ is stable in the presence of $O_2$, but at higher values, the $Ce^{3+}$ can be oxidized to $Ce(OH)_4$ by $O_2$ through several intermediate hydrolytic forms of $Ce^{4+}$. Since the pH of solutions used in this study is ranging between 4 and 5, the predominant cerium species at the NPs surface are $Ce^{3+}$ and $Ce(OH)_2^{2+}$. The catechol can stabilize the $Ce(OH)_2^{2+}$ as a catecholate cerium complex $Ce(OH)_2(C_6H_4O_2)$. Additionally, the $Ce^{4+}$ species at the $NP_S$ surface can oxidize catechol with semiquinone formation according with Equation 1, and further generate charge transfer complexes with the cerium ions. These organic complexes are the origin of the weight loss in the TGA curve of the catechol-CeO$_2$ NPs and demonstrate the binding between catechol and CeO$_2$ NPs. Similar weight losses were reported in literature for catechol-chitosan and polyphenol modified iron NPs. The weight loss is presumed to be from the pyrolysis of the benzene ring. Catechol may adsorb onto CeO$_2$ surface via molecular adsorption, or form mono- or/and bi-dentate bridge complexes involving deprotonation of the OH groups, similar to those reported previously between catechol and TiO$_2$ or catechol and iron oxide NPs. Additional evidence of this phenomenon is provided by the change in the zeta potential value, which decreased from ~+40.4 mV (CeO$_2$ NPs) to ~+19.5 mV for catechol-CeO$_2$ NPs, as shown in panel B of FIG. 6. The inner-sphere complexation between the electron acceptor, i.e. CeO$_2$ NPs, and the organic ligand which provides an electron donor environment for these particles facilitates formation of hybrid ligand-to-metal charge transfer complexes that are responsible for the characteristic absorption bands observed in the UV-Vis spectra.

Figure 6:
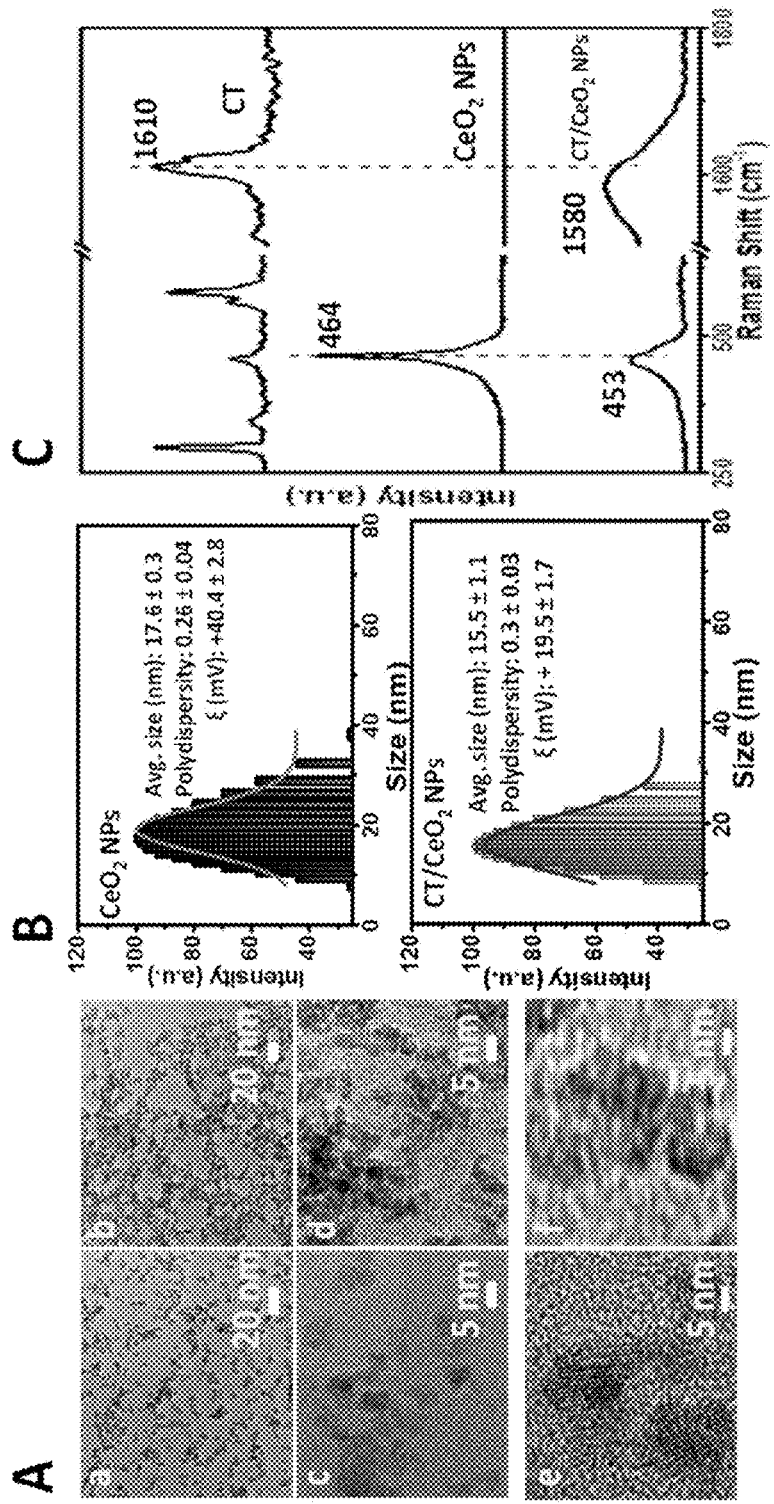
FIG. 6 shows HRTEM images and particle size distribution histograms, in accordance with an embodiment.

The HRTEM shows uniform particles with an average size of around 10-20 nm, as shown in panel A of FIG. 6. According to an embodiment, panel A of FIG. 6 is HRTEM images of a) bare CeO$_2$ NPs and b) catechol (CT)/CeO$_2$ NPs, at different magnification; c and e) bare CeO$_2$ NPs, and d and f) CT/CeO$_2$ NPs. According to an embodiment, panel B of FIG. 6 is particle size distribution histograms. According to an embodiment, panel C of FIG. 6 is Raman spectra of CT, bare CeO$_2$ NPs, and the CT/CeO$_2$ NPs.

The particle size distribution of the colloidal dispersion shows good dispersity after complexation. However, the average size of the particles measured by DLS decreases slightly from 17.6 (±0.3) to 15.5 (±1.1) nm upon interaction with the ligand, as shown in panel B of FIG. 6. Moreover, the crystallinity was affected as seen by XRD. The decreased size and crystallinity might be due to particle etching during the surface oxidation/catecholate-ligand exchange processes. Several changes are also seen in the Raman structure of the NPs after exposure, as shown in panel C of FIG. 6. The peak at 1610 cm$^{-1}$ which is attributed to the aromatic ring vibrations of catechol[57] shifted to lower frequency (at 1580 cm$^{-1}$) and broadened upon reaction with CeO$_2$ NPs. Furthermore, bare CeO$_2$ NPs show a high intense peak at 464 cm$^{-1}$ which is attributed to the Raman-active vibrational mode (F$_{2g}$) of the fluorite-type structure. Interestingly, after exposure to catechol, this peak showed reduced intensity, broadening and a shift to lower frequency (at 453 cm$^{-1}$). These changes are known indicators of complexation, further confirming the presence of organic ligands on the particle surface. The CeO$_2$ NPs utilized in this work have been stabilized with acetate as per the manufacturer description. The structural changes observed at the surface indicate strong binding of the di-hydroxyl functionalized ligands which can compete and replace some of the acetate by ligand exchange due to competitive adsorption.

Figure 7:
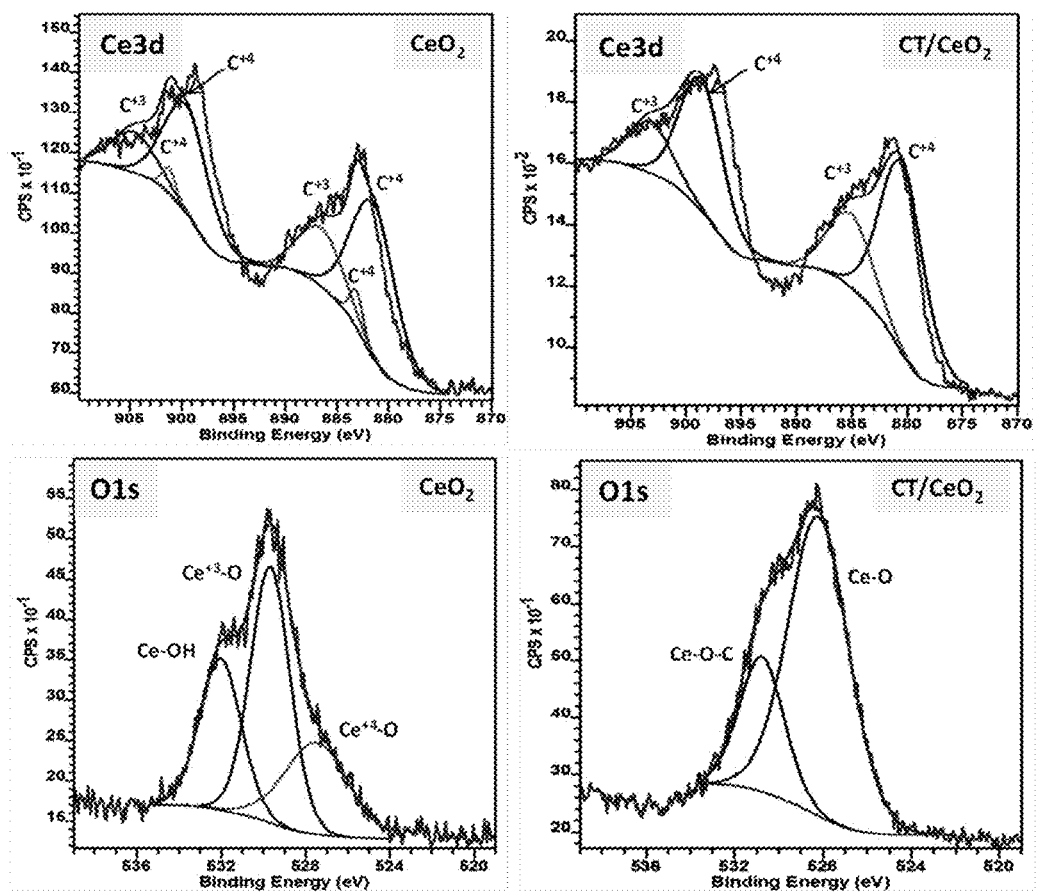
FIG. 7 shows Ce3d and O1s XPS spectra, in accordance with an embodiment.

Changes in the surface chemistry of the NPs following exposure to catechol were further assessed using XPS. The Ce3d and O1s spectra are illustrated in FIG. 7. As expected, the cerium species on the CeO$_2$ surface are present in dual oxidation states: 3+ and 4+ respectively. The relative concentration of the different cerium species before and after exposure to catechol was estimated by integrating the peaks area corresponding to the Ce$^{3+}$ and Ce$^{4+}$. The relative content of Ce$^{3+}$ was found to increase from ~35% for CeO$_2$ NPs to ~39% for catechol-CeO$_2$ NPs. Next, the O1s spectra were analyzed, as shown in FIG. 7. The Gaussian fitting for O 1s of CeO$_2$ NPs shows three major components: at 527.5 eV assigned to the oxygen bound to Ce$^{4+}$, one at 529.7 eV assigned to the oxygen bound to the Ce$^{3+}$, and one at 532 eV assigned to hydroxyl groups or water molecules bound to cerium ions. The O1s XPS spectrum of catechol-CeO$_2$ NPs has two major components: one at 528.2 eV assigned to the oxygen bound to the Ce ions and one at 530.8 eV for the oxygen in Ce—O—C. Cumulatively, the UV-Vis, FTIR, TGA and XPS data showing an increase in the Ce$^{3+}$ content, presence of Ce—O—C bonds and absence of OH in CeO$_2$ NPs exposed to catechol indicate that Ce$^{4+}$ oxidizes the catechol molecules to the corresponding quinones, and the oxidation product is involved in a charge transfer process with the cerium ions at the NPs surface.

Fabrication and Characterization of the Ligand-Functionalized Membrane.

Figure 8:
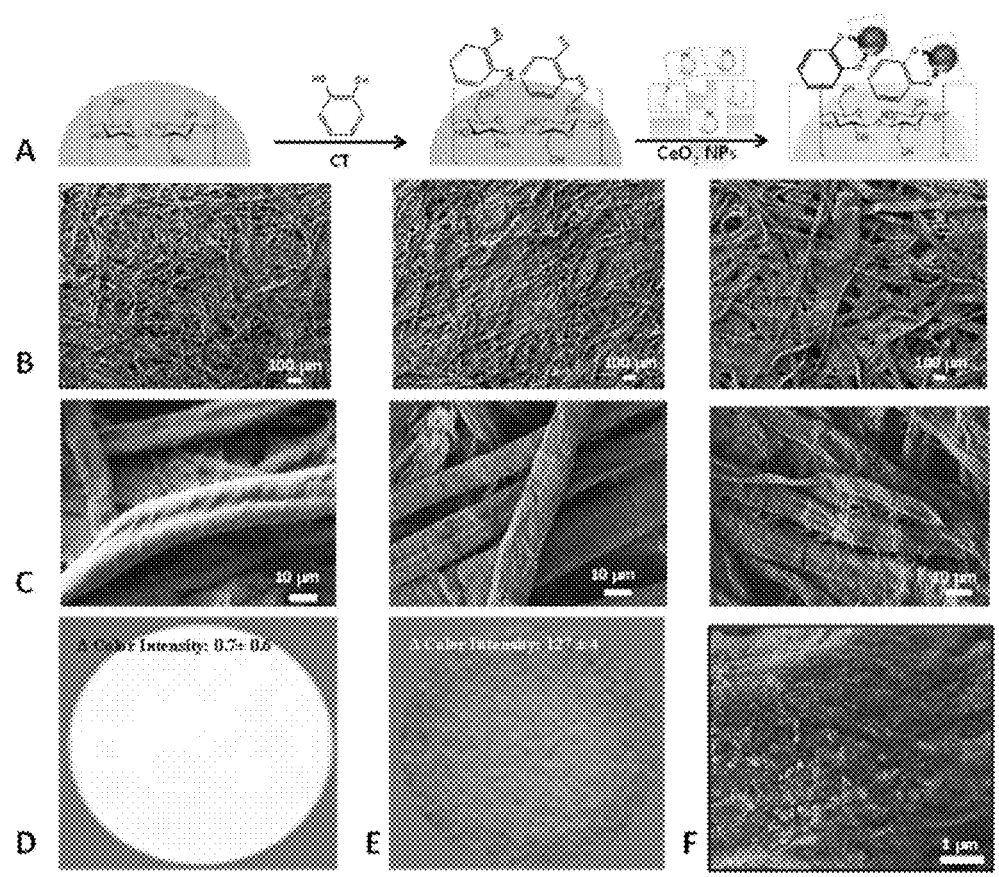
FIG. 8 shows schematic representation of the capture, sequestration and tracking of NPs to cellulosic membrane, SEM images of the membrane, and color of the ligand-grafted membrane, in accordance with an embodiment.

Cellulose filter paper was selected as support to fabricate the membrane, as a model example. Other materials that can be used include silk, cotton, wool, linen, nylon, rayon, and/or polyester, among others. Attachment of the two ligands, catechol and ascorbic acid to the cellulosic surface takes place through physical adsorption, H-bonding and electrostatic interactions between the hydroxyl functionalities of the ligand and the OH-rich cellulosic paper, as shown in FIG. 8. Panel A of FIG. 8 is a schematic representation of the capture, sequestration and tracking of NPs to cellulosic membrane (Spectrum CFP40) using catechol as example. Panels B and C of FIG. 8 are SEM images of the membrane before functionalization (left), after ligand grafting (middle) and after exposure to CeO$_2$ NPs (9.2×10$^{13}$ NP/mL) (right) at a magnification of 100 μm (B) and 10 μm (C). Panels D and E of FIG. 8 show the color of the ligand-grafted membrane before (D) and after (E) exposure to CeO$_2$ NPs. The color change in presence of NPs is due to surface retention and binding with formation of charge transfer complexes. Panel F of FIG. 8 are SEM micrographs of NP-functionalized fiber at 1 μm magnification.

Figure 9:
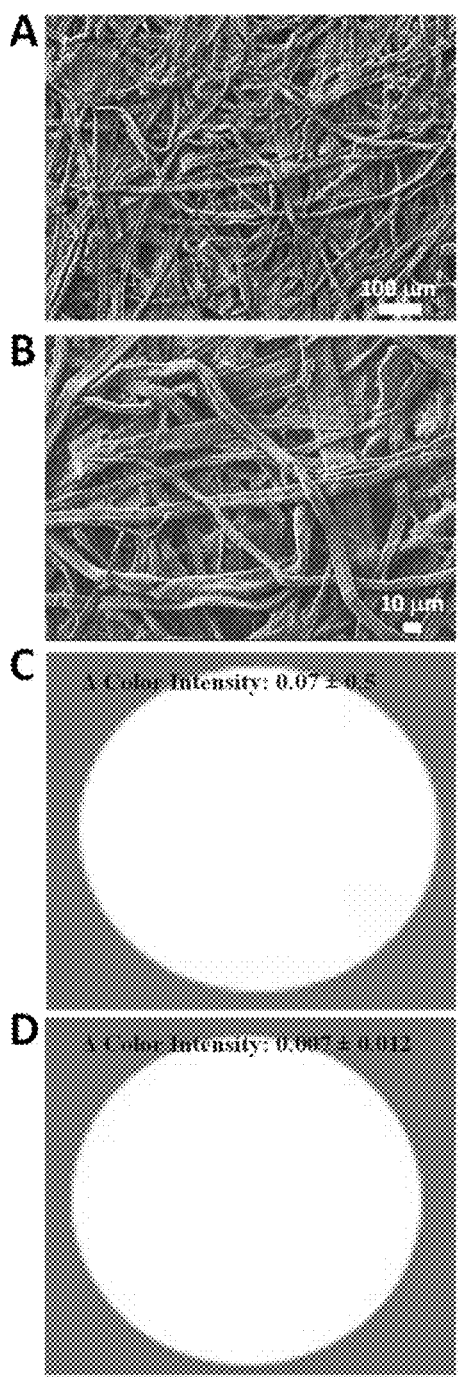
FIG. 9 is SEM images and EDX analysis, in accordance with an embodiment.
Figure 10:
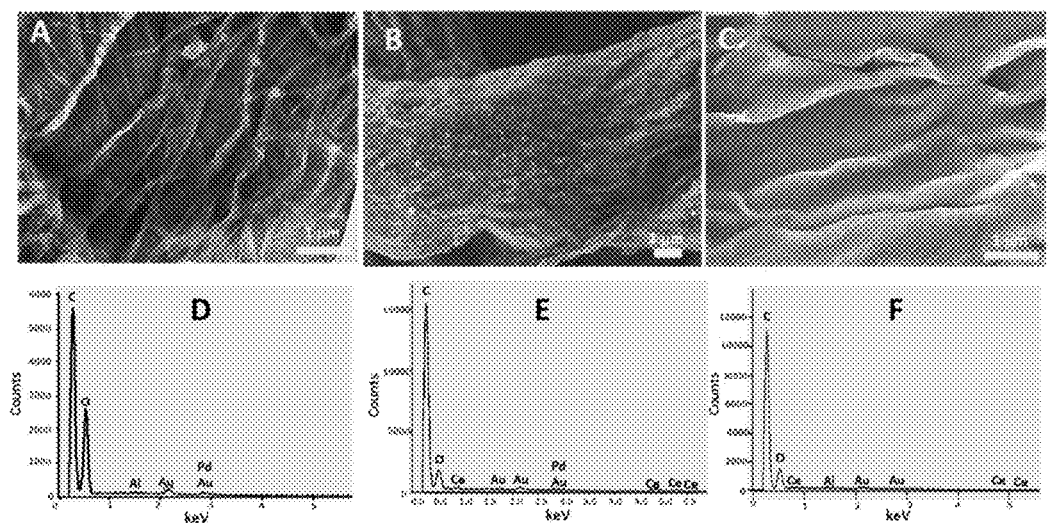
FIG. 10 shows high magnification SEM images and EDX analysis confirm the presence of the CeO2 NPs on the surface of functionalized paper, in accordance with an embodiment.

The modification provides fibers with functional sites for capture of the NPs to their surface. The interaction between the ascorbic acid and catechol ligands involving surface oxidation and interphase complexation described previously were utilized to collect and quantify the NPs onto the paper surface. Therefore, the ligand-grafted membrane has the capability to bind the particles through surface complexation and then visualize their distribution through formation of strongly absorbing charge transfer complexes. FIG. 8 shows the morphological changes of the cellulosic membrane investigated by SEM before and after functionalization. After modification with the capture ligands, the smoothness of the cellulosic fiber decreased while the interconnecting network increased. Further exposure to CeO$_2$ NPs resulted in increased flatness and roughness of the individual fibers as a result of NP binding. The high magnification SEM illustrates a homogenous distribution of NPs over the entire membrane surface, with a slight increase of size generated by the drying process. CeO$_2$ NPs binding also result in a rapid and significant change in color from white to dark brown due to formation of charge transfer complexes between the exposed di-hydroxyl functionalities of the capture ligands and the cerium at the particle surface. This visual change suggests that the membrane can be used as a visual test to quantify distribution and concentration of NPs. The color intensity of the ligand-functionalized paper exposed to (9.2×10$^{13}$ NP/mL) CeO$_2$ NPs was (127±4). By comparison, when the filter paper without ligand was exposed to the same concentration of NPs the color intensity was low (0.07±0.5), undetectable with the naked eye, as shown in FIG. 9. This demonstrates that presence of catechol is required for achieving colorimetric quantification of the NPs. The color intensity of the filter paper alone was also low (0.007±0.5), as shown in FIG. 9. Furthermore, high magnification SEM images and EDX analysis confirm the presence of the $CeO_2$ NPs on the surface of the functionalized paper, as shown in FIG. 10. Notably, the SEM images of the filter paper and filter paper in absence of catechol upon exposure to $CeO_2$ NPs show different morphologies, as shown in FIG. 10, which indicate that the presence of the ligand is involved in particle binding, likely due to its reactivity. Taken together, these findings suggest that ligand grafting is the key step in the tracking and colorimetric detection of $CeO_2$ NPs on filter paper.

Figure 11:
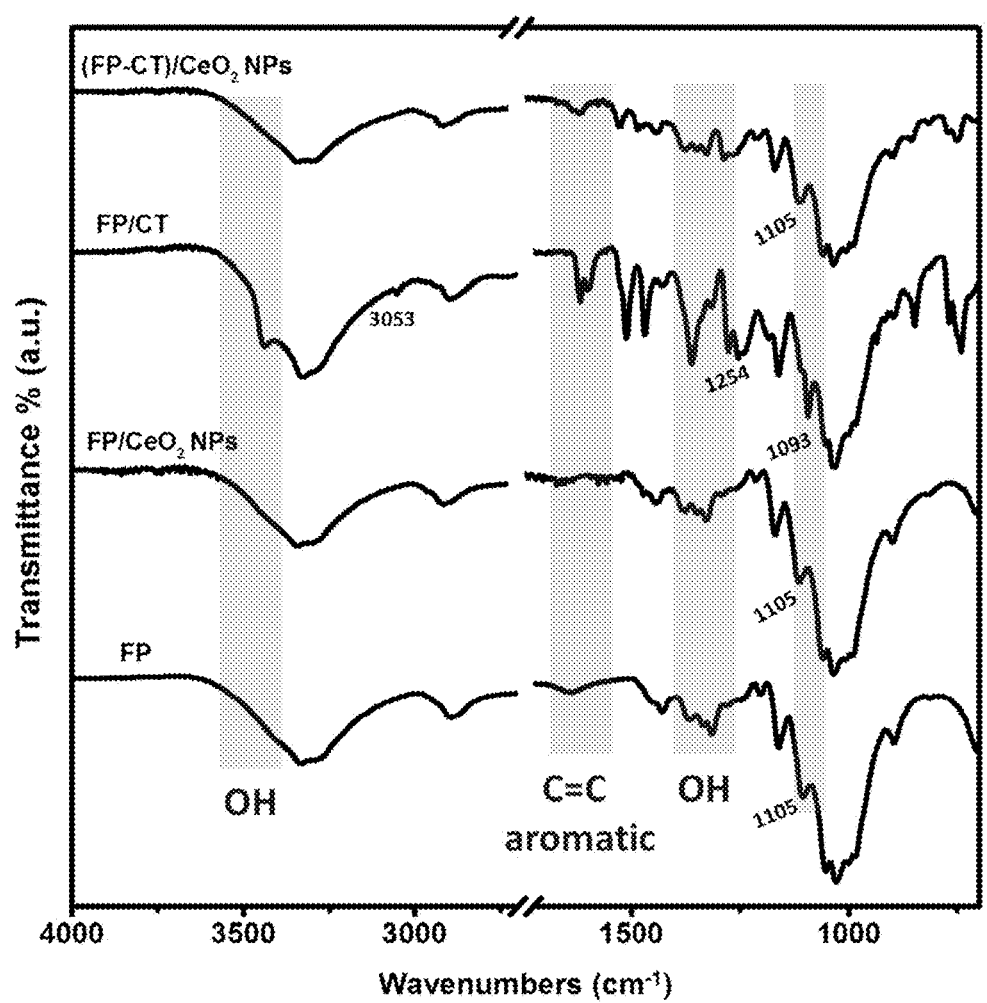
FIG. 11 is ATR-FTIR of interactions between ligand and CeO2 NPs on the fiber surface, in accordance with an embodiment.

The interactions between ligand and $CeO_2$ NPs on the fiber surface were further evaluated using ATR-FTIR, as shown in FIG. 11. According to an embodiment, FIG. 11 shows ATR-FTIR spectra of the cellulosic filter paper (FP) (Spectrum CFP40) functionalized with CT before and after exposure to $CeO_2$ NPs ($9.2 \times 10^{13}$ NP/mL), and FP/$CeO_2$ NPs of FP exposed to the same concentration of NPs without functionalization. The bare cellulosic filter paper and the paper exposed to $CeO_2$ NPs showed similar FTIR spectral signatures. By comparison, the catechol-treated filter paper showed a new peak at ~3440 $cm^{-1}$ which may be due to the H-bonding between surface OH groups of the cellulosic material and catechol. This peak disappeared after exposure to $CeO_2$ NPs which indicates the involvement of these groups in the adsorption and particle binding process. The intensity of the peaks of $C=C$ aromatic ring stretching and OH deformation at 1620 and 1365 $cm^{-1}$ significantly decreased after exposure to $CeO_2$ NPs. Other significant changes were also observed in the regions of aromatic (C—H), phenolic (C—O) and (O—H) bands at 3053, 1254 and 1093 $cm^{-1}$. These results suggest band deformation and indicate deprotonation of the OH groups and interphase complexation through ligand binding to the $CeO_2$ NPs surface.

Evaluation of Membrane Performance for Particle Tracking.

Figure 12:
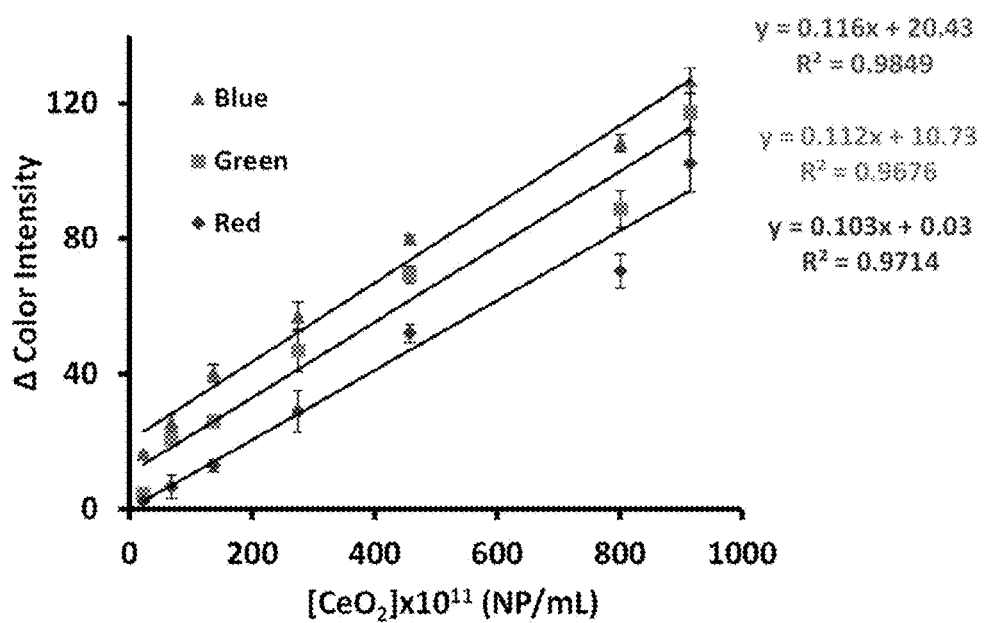
FIG. 12 shows calibration using RGB color channels, in accordance with an embodiment.

The observed color change of the ligand-grafted membrane upon exposure to the NPs was further exploited to design a portable system to evaluate binding and tracking of NPs. The concentration and particle size distribution profile can be visualized as a number of counts varying proportionally with the blue color intensity. Calibration using the RGB color channels is shown in FIG. 12. The blue color, which is the complementary color of yellow/orange/brown provides the highest sensitivity. The color intensity profile is indicative of the level of dispersion of the NPs bound to the membrane.

Figure 13:
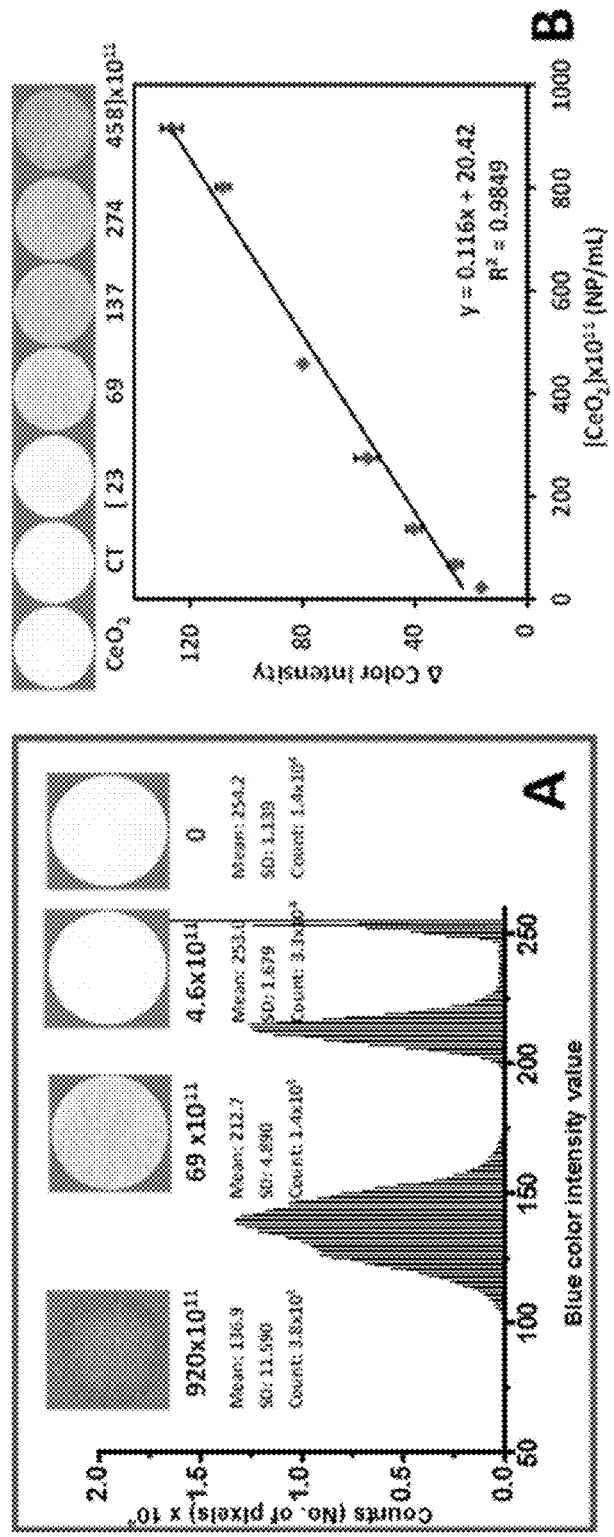
FIG. 13 shows analysis of catechol-modified cellulosic paper, in accordance with an embodiment.
Figure 14:
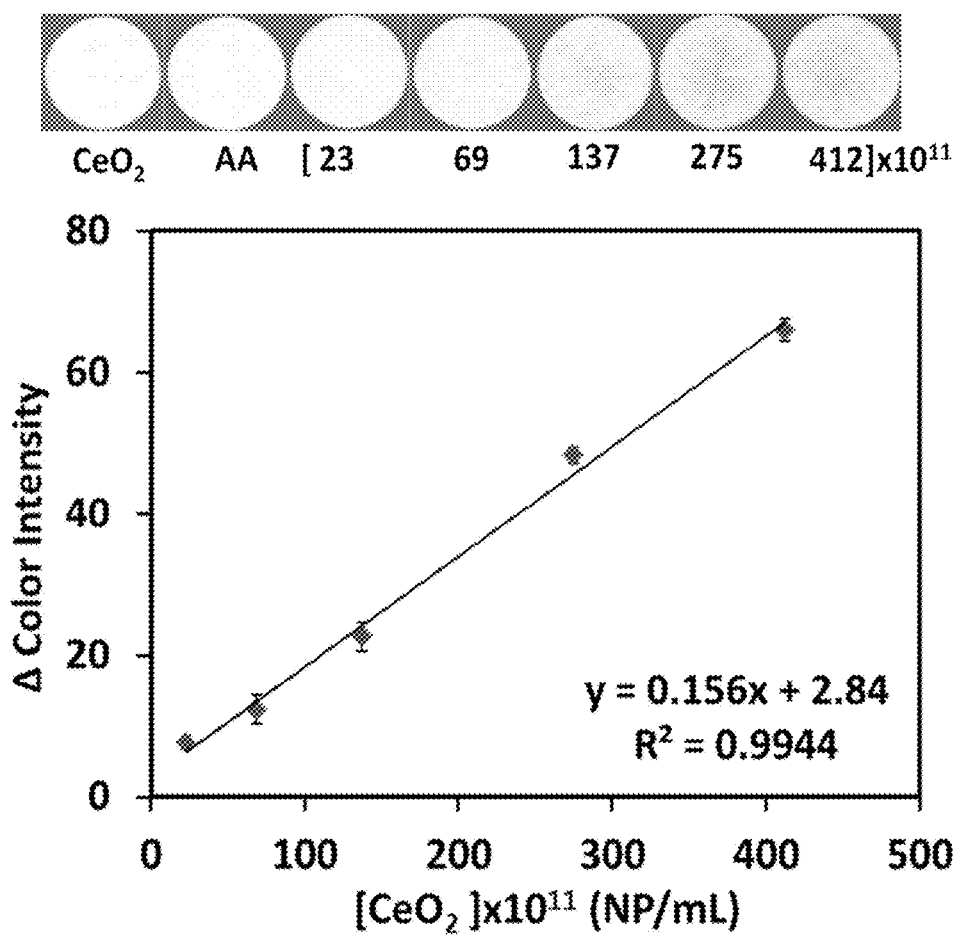
FIG. 14 shows colorimetric responses of membranes, in accordance with an embodiment.
Figure 15:
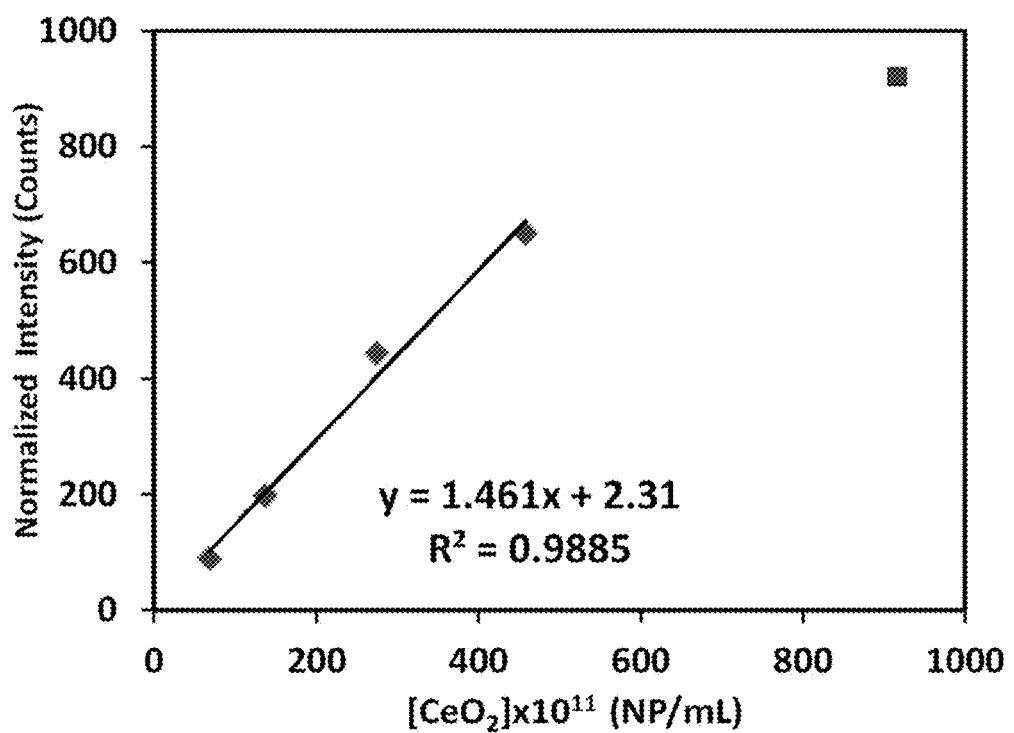
FIG. 15 shows calibration curves, in accordance with an embodiment.

Referring to panel A of FIG. 13 are histograms of blue color channel of catechol-modified cellulosic paper (Spectrum CFP40) exposed to: (0, 4.6, 69 and 920)$\times 10^{11}$ NP/mL of $CeO_2$ NPs. Panel B of FIG. 13 are colorimetric responses of catechol-grafted paper upon exposure to different concentrations of $CeO_2$ NPs and the corresponding calibration curve of the A color intensity (average responses and standard deviation for n=3). The color intensity histograms shown in FIG. 13 indicate good dispersity upon sequestration and surface complexation. The intensity is proportional with the NP concentration for the two tested ligands. By comparison, the ligand-grafted membrane shows no color in absence of particles. Panel B of FIG. 13 and FIG. 14 shows colorimetric responses of membranes prepared with catechol and ascorbic acid, respectively, exposed to different concentrations of $CeO_2$ NPs and their corresponding calibration curves. The linear ranges, quantified from the color intensity of scanned images demonstrate the ability of this platform to quantify $CeO_2$ NPs in the concentration range of $(23 \times 10^{11} - 9.2 \times 10^{13})$ NP/mL with detection limits of $14.9 \times 10^{11}$ and $19.2 \times 10^{11}$ NP/mL for catechol and ascorbic acid, respectively. Changes in optical properties of the functional platform upon exposure to particles are associated to surface oxidation by the immobilized ligand, particle sequestration and formation of charge transfer complexes on paper, similar to those observed in colloidal dispersions. The color change varies with the reducing capacity of Ce(IV) to Ce(III), and the $Ce-(OH)_2^{2+}$ species as well as with the binding ability of each ligand and is dependent on the oxidation potential and the chemical structure (e.g. the size, position and number of the OH substituents) of the organic ligands. The colorimetric measurements of the NPs obtained from scanned images of the functional paper were further compared with analysis of the same samples by XRF. For this purpose, catechol-modified paper disks were prepared using the same experimental procedure and exposed to the same NPs concentrations. The calibration curve, shown in FIG. 15, shows concentration-dependent responses in $CeO_2$ NPs in the range of $(68.7-460 \times 10^{11})$ NP/mL with a detection limit of $4.7 \times 10^{11}$ NP/mL. XRF is 10 times more sensitive than the colorimetric method, but has a shorter linear concentration range. However, if only the short concentration range of $(68.7-460) \times 10^{11}$ NP/mL is compared, the sensitivities are similar. Additionally, the colorimetric method is easier to perform and does not involve the use of an advanced instrument.

The effect of different ligands used as stabilizers during $CeO_2$ synthesis was further determined. For this, particles of ~10 nm diameter were modified with citric acid, glycine, and a long chain polyacrylic acid-oleylamine (PAA-OA) copolymer. Their characteristics are provided in Table 1.

TABLE 1

Characteristics of $CeO_2$ NPs with different types of surface coating

| Sample | Source | Surface modification | Nature of NPs | NPs Size (nm) |
|---|---|---|---|---|
| A | Synthesized | Polyacrylic acid-Oleylamine (PAA-OA) copolymer | Colloidal, 10% dispersion in 0.1M $Na_2CO_3$, high pH | <10 |
| B | Commercial modified | No information Sigma-Aldrich, #544841 | nanopowder, washed and dried at 105° C. | <25 |
| C | Synthesized | Citric acid | nanopowder | <10 |
| D | Synthesized | Glycine | nanopowder | 20-40 |
| E | Synthesized | PAA-OA calcined at 300° C. | nanopowder | <10 |

Figure 16:
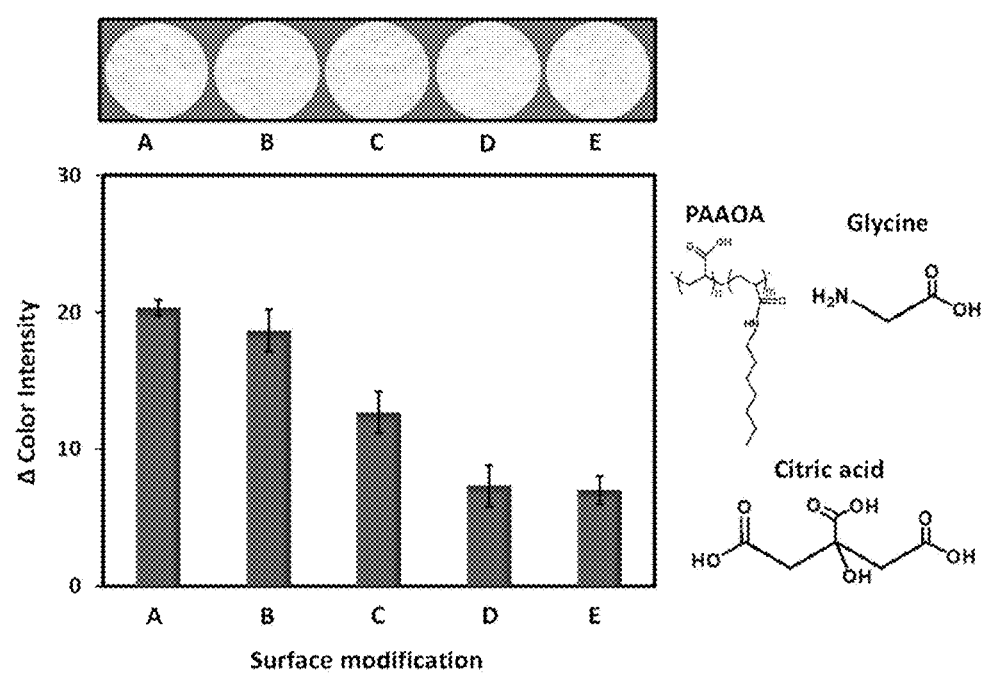
FIG. 16 shows the response of NPs modified with different coating agents including PAA-OA, citric acid, and glycine in accordance with an embodiment.

The functional paper provides quantifiable responses to the different types of $CeO_2$ NPs, but with different intensity. The NPs modified with PAA-OA showed higher response as compared to those modified with citric acid or glycine, as shown in FIG. 16. These results demonstrate that the method is generally applicable to varying types of $CeO_2$ NPs. Since the method principle relates to the reducing ability of the NPs, this assay can be used to screen the reactivity of different types of $CeO_2$ NPs and assess reactivity changes in varying conditions. In addition to simplicity in analysis, the method is reproducible and robust. The standard deviation of the assay was consistently below 5% for both ligands.

Figure 17:
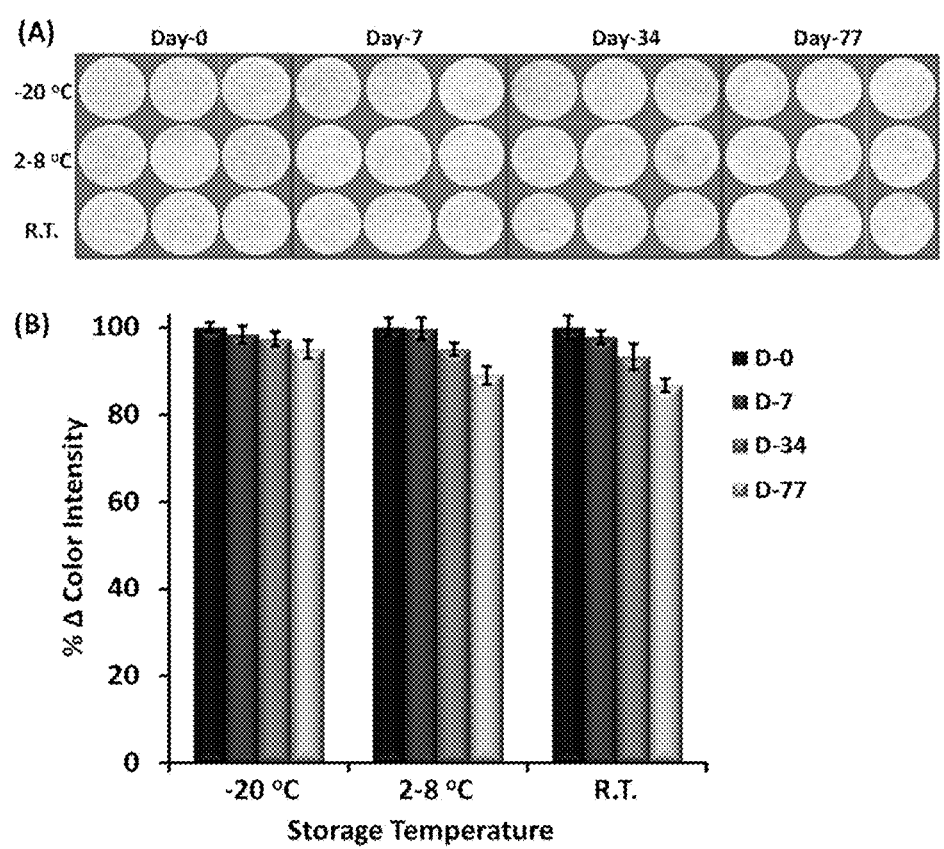
FIG. 17 shows stability of modified membranes, in accordance with an embodiment.
Figure 18:
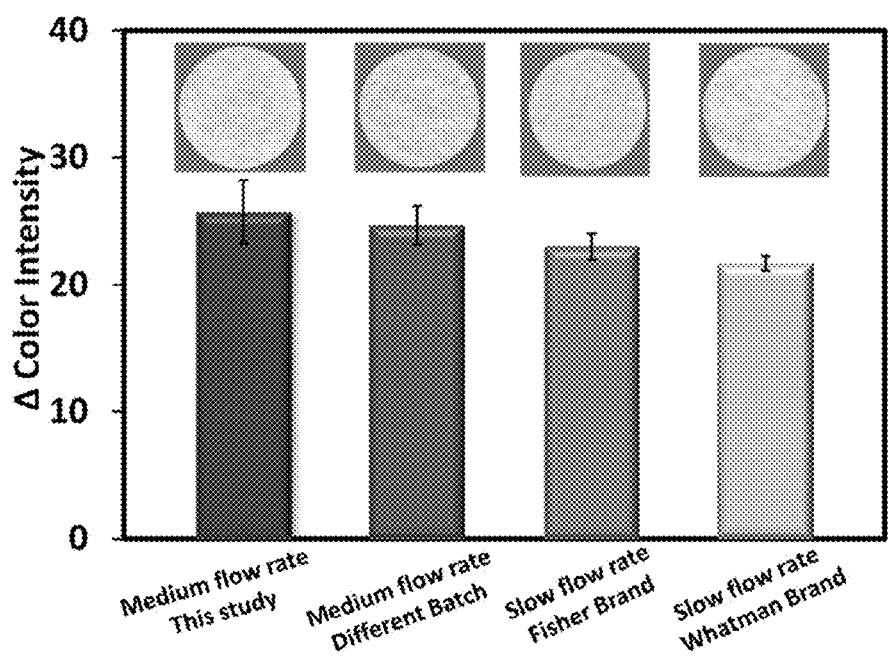
FIG. 18 shows colorimetric responses observed with several types of filter paper, in accordance with an embodiment.

The modified membranes are stable and can be used for months when stored in vacuum, under dark at room temperature, refrigerator or freezer, as shown in FIG. 17. Furthermore, different types of cellulosic filter papers, as well as different batches of filter paper from the same supplier were investigated. The results are shown in FIG. 18. Colorimetric responses were observed with all types of filter paper tested. The slow flow rate filter papers were found to have slightly lower sensitivities, possibly due to different porosity and sorption capacity. The papers from different batches showed close responses with small variation (<5%). These results demonstrate functionality of the capture and tracking mechanism of this platform and its ability to quantitatively determine $CeO_2$ NPs in a single-step procedure, without the use of advanced instrumentation, external reagents, mixing or amplification steps.

Selectivity of the Method.

The selectivity of the method was evaluated for varying types of metal oxides, including $TiO_2$, $Fe_2O_3$, $ZrO_2$, $Sb_2O_3$, ZnO, $SiO_2$, CuO and $Al_2O_3$ NPs under the same conditions and at the same concentration. The physicochemical characteristics of these oxides are listed in Table 2. Catechol is known to adsorb on metallic, metal oxide and quantum dots (CdSe) NP surfaces via hydrogen-bond and electrostatic interactions involving hydroxyl groups, with stronger binding ability in basic conditions.

TABLE 2

Characteristics of different types of metal oxides tested in the selectivity study.

| Particles | Nature of NPs | NPs Size (nm) |
|---|---|---|
| $TiO_2$ | nanopowder | 10-30 |
| $Fe_2O_3$ | nanopowder | 20-40 |
| $ZrO_2$ | nanopowder | 40 |
| $Sb_2O_3$ | nanopowder | 80-200 |
| ZnO | nanopowder | 10-30 |
| $SiO_2$ | Colloidal, 30% $SiO_2$, acidic | 35 |
| CuO | nanopowder | 40 |
| $Al_2O_3$ | nanopowder | 300 |

Figure 19:
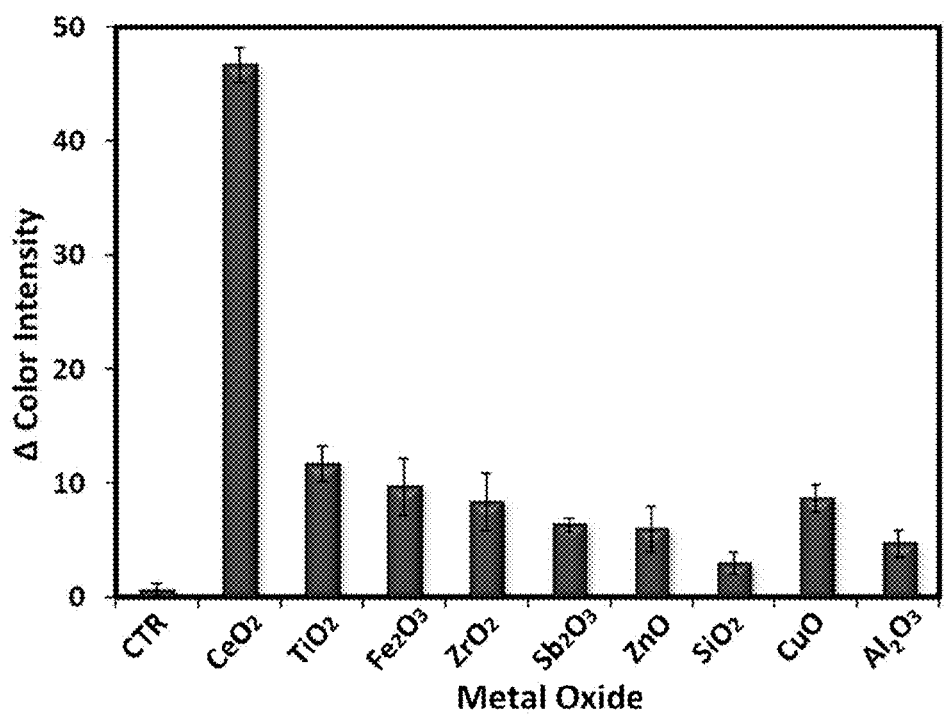
FIG. 19 shows colorimetric responses of catechol-functionalized paper membrane, in accordance with an embodiment.
Figure 20:
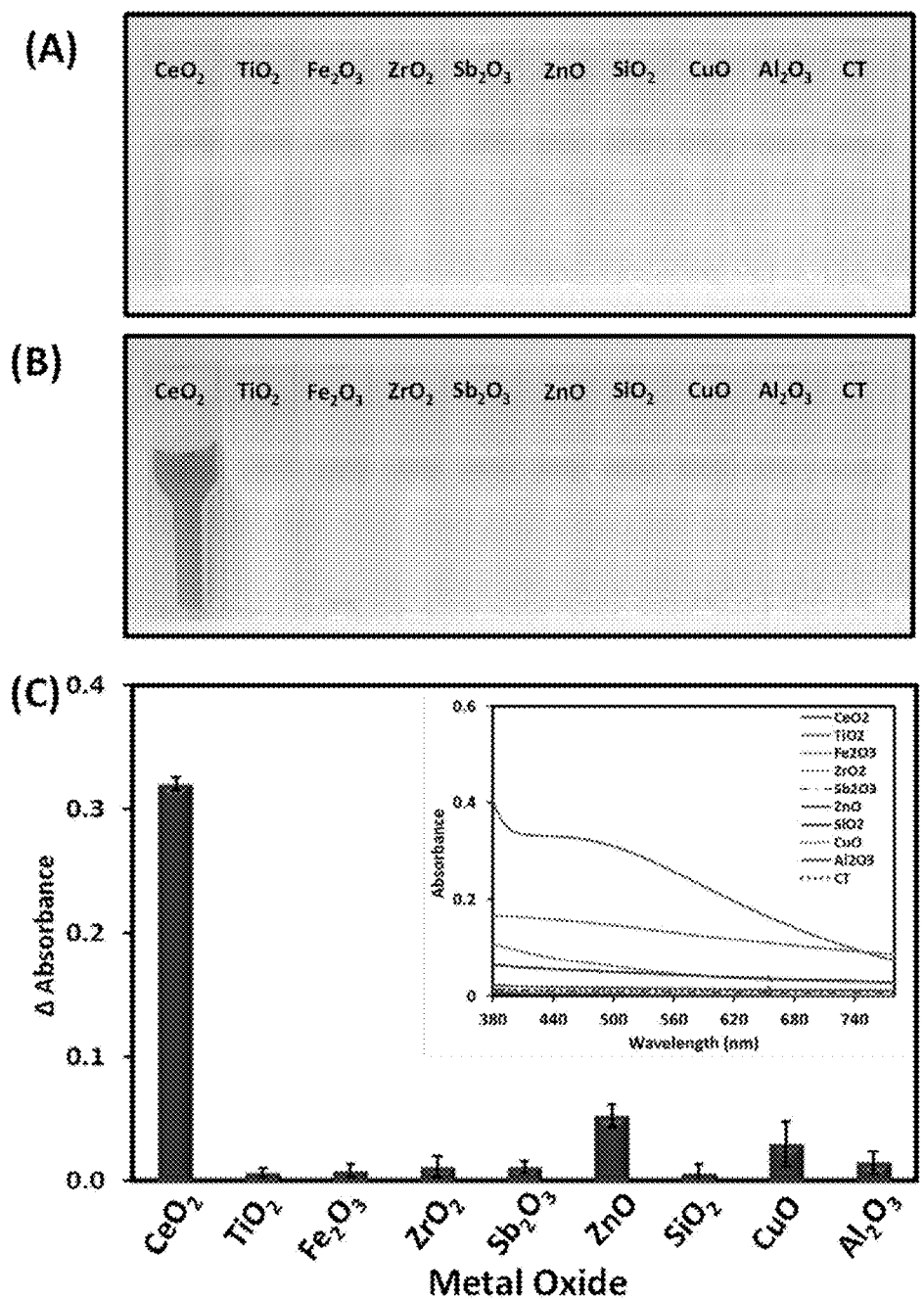
FIG. 20 shows UV-Vis spectra of colloidal dispersions with catechol, in accordance with an embodiment.

Referring to FIG. 19 are colorimetric responses of catechol-functionalized paper membrane (Spectrum CFP40) exposed to different types of metal oxides. For example, FIG. 19 shows comparative color intensity changes of paper discs exposed to selected metal oxide NPs. The catechol-modified paper exposed to other oxides show slight color changes when measured with the scanner. However, these changes are lower than those seen with $CeO_2$. This trend was also observed in the UV-Vis spectra of colloidal dispersions with catechol, as shown in FIG. 20. $SiO_2$ colloidal dispersion shows negligible color change. $Fe_2O_3$, $Sb_2O_3$, and $ZrO_2$ form a slight brownish color, while ZnO and $TiO_2$ NPs form greenish and orange complexes, respectively, with much lower sensitivity. The orange color of $Fe_2O_3$ is a characteristic of the NPs and can be seen before exposure to catechol. The selectivity of colorimetric responses was further confirmed by their color code number obtained from Adobe Photoshop and listed in Table 1.

TABLE 1

Color codes of catechol-grafted filter papers upon exposure to different types of metal oxides, obtained from Adobe Photoshop software.

| Metal Oxide | Color Code No. |
|---|---|
| $CeO_2$ | F1DED5 |
| $TiO_2$ | FFFDF6 |
| $Fe_2O_3$ | F6F1EB |
| $ZrO_2$ | FBFBF3 |
| $Sb_2O_3$ | FEFFFA |
| ZnO | FCFBF5 |
| $SiO_2$ | F9F9EE |
| CuO | FAF6ED |
| $Al_2O_3$ | FDFDF1 |

Figure 21:
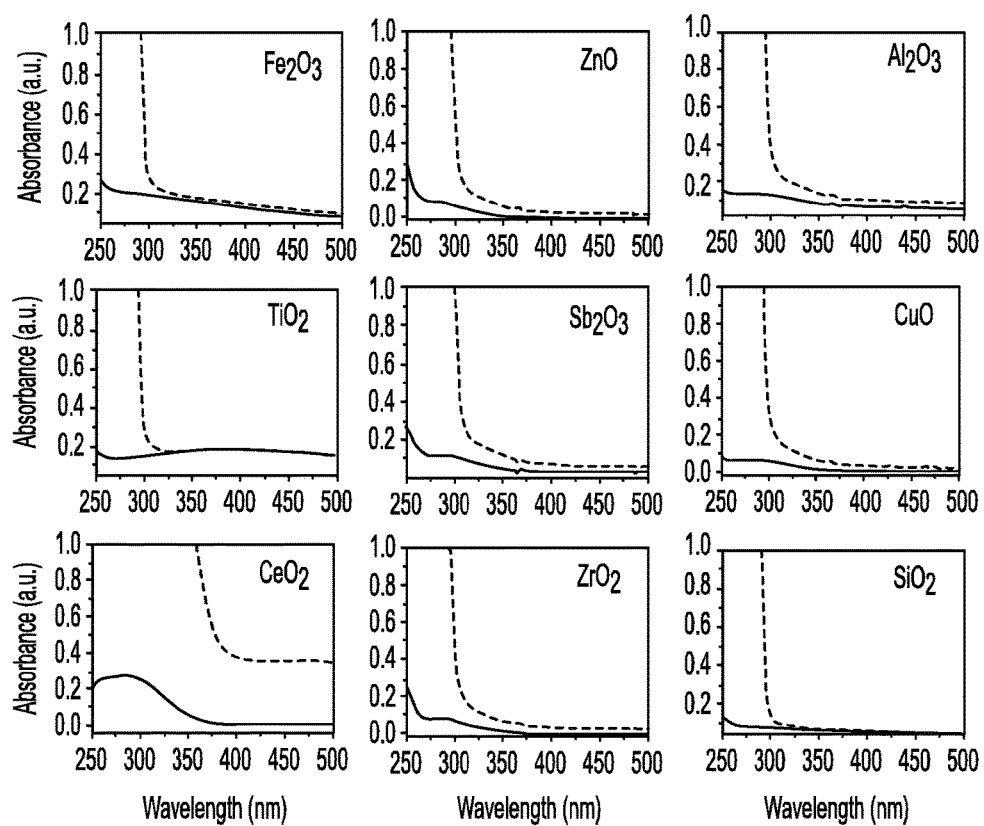
FIG. 21 shows UV-Vis spectra of the varying metal oxide NPs, in accordance with an embodiment.

The use of color codes is a common practice in color analysis and could be explored in the future to categorize NPs using this method. The UV-Vis spectra of the varying oxides upon exposure to catechol exhibited lower peak intensity values in the visible region, as compared to $CeO_2$, as shown in FIG. 21. The stronger response of $CeO_2$ could be due to catalytic oxidation and formation of charge transfer complexes as compared to simple physical adsorption for the other oxides. While the other oxides have OH-rich surfaces promoting molecular absorption at their surface, the $CeO_2$ NPs also have redox activity which facilitates oxidation of catechol to quinone compounds with further formation of charge transfer complexes. Therefore, the different pattern observed originates from stronger absorbing quinone complexes with cerium as opposed to surface adsorbed catechol. These results demonstrate relative selectivity of the sensor for detection of $CeO_2$ as compared to other metal oxides. This characteristic is an advantage of this sensor as compared to other assays reported in literature for detection of metal oxide NPs. The performance of this method as an analytical tool for tracking and quantitative evaluation of NPs as compared to previously reported assays, their corresponding detection principles and characteristics are summarized in Table 3.

TABLE 3

Comparison of measurement performance of the proposed platforms versus other NP-colorimetric detection methods reported in the literature.

| LOD | LOQ | Response/Real sample | Linear ranges | Detection principle |
|---|---|---|---|---|
| $0.36 \times 10^{11}$ NP/mL | $1.2 \times 10^{11}$ NP/mL | Visual detection within seconds Responds for $CeO_2$ | $CeO_2$ NPs ranging from $(0.46-5.5) \times 10^{11}$ NP/mL | Ability of $CeO_2$ NPs to react selectively via oxidative and surface |

TABLE 3-continued

Comparison of measurement performance of the proposed platforms versus other NP-colorimetric detection methods reported in the literature.

| LOD | LOQ | Response/ Real sample | Linear ranges | Detection principle |
|---|---|---|---|---|
| | | as well to other oxides NPs such as $TiO_2$, $Fe_2O_3$, $Sb_2O_3$, ZnO, $ZrO_2$, CuO, $SiO_2$, and $Al_2O_3$ | | chelation processes with readily oxidizible ligands containing o-dihydroxy functionalities, such as catechol and ascorbic acid. |
| $14.9 \times 10^{11}$ NP/mL | $49.7 \times 10^{11}$ NP/mL | Responds for $CeO_2$ as well to other oxides NPs such as $TiO_2$, $Fe_2O_3$, $Sb_2O_3$, ZnO, $ZrO_2$, CuO, $SiO_2$, and $Al_2O_3$ CMP wastewater | $CeO_2$ NPs ranging from $23 \times 10^{11}$-$9.2 \times 10^{13}$ NP/mL | Surface confined colorimetric response of ligand-functionalized platform exposed to NPs |
| $4.5 \times 10^{11}$ NP/mL | $15 \times 10^{11}$ NP/mL | Responds for $CeO_2$ NPs | $CeO_2$ NPs ranging from $(23\text{-}115) \times 10^{11}$ NP/mL | Microarray detection spots created by nanodot printing |
| 89-1,759 µg/L | 526-5,864 µg/L | Responds to both metals (e.g., Ag and Au) and oxide NPs Environmental water (e.g., lake water, NOM) and biological matrices (e.g., artificial urine, mouse serum). | Wide range of metals (e.g., Ag and Au) and oxide (e.g., $CeO_2$, $SiO_2$, $VO_2$) NPs with a diameter range of 5 to 400 nm and multiple capping agents. | Solution-based colorimetric method for general NP measurements |
| 100-1000 µg/L | — | Measurements of various sizes and shapes of Au nanostructures No real sample demonstrated | Detection varies with various types of NPs | Using changes in the visible absorbance spectra of dyes in aqueous solutions before and after exposure to the NPs |
| 2.0 µg/mL | — | Measurements of types of $MnO_2$ nanosheets Real lake water | Solution-based naked eye detection | Detection soluble TMB dye |

High Throughput Measurements Using Microarray and Dot Printing Technique.

To increase sample throughput, the optimized method was demonstrated on microarray detection spots created by dot printing of catechol, followed by dispensing of $CeO_2$ NP dispersions.

Figure 22:
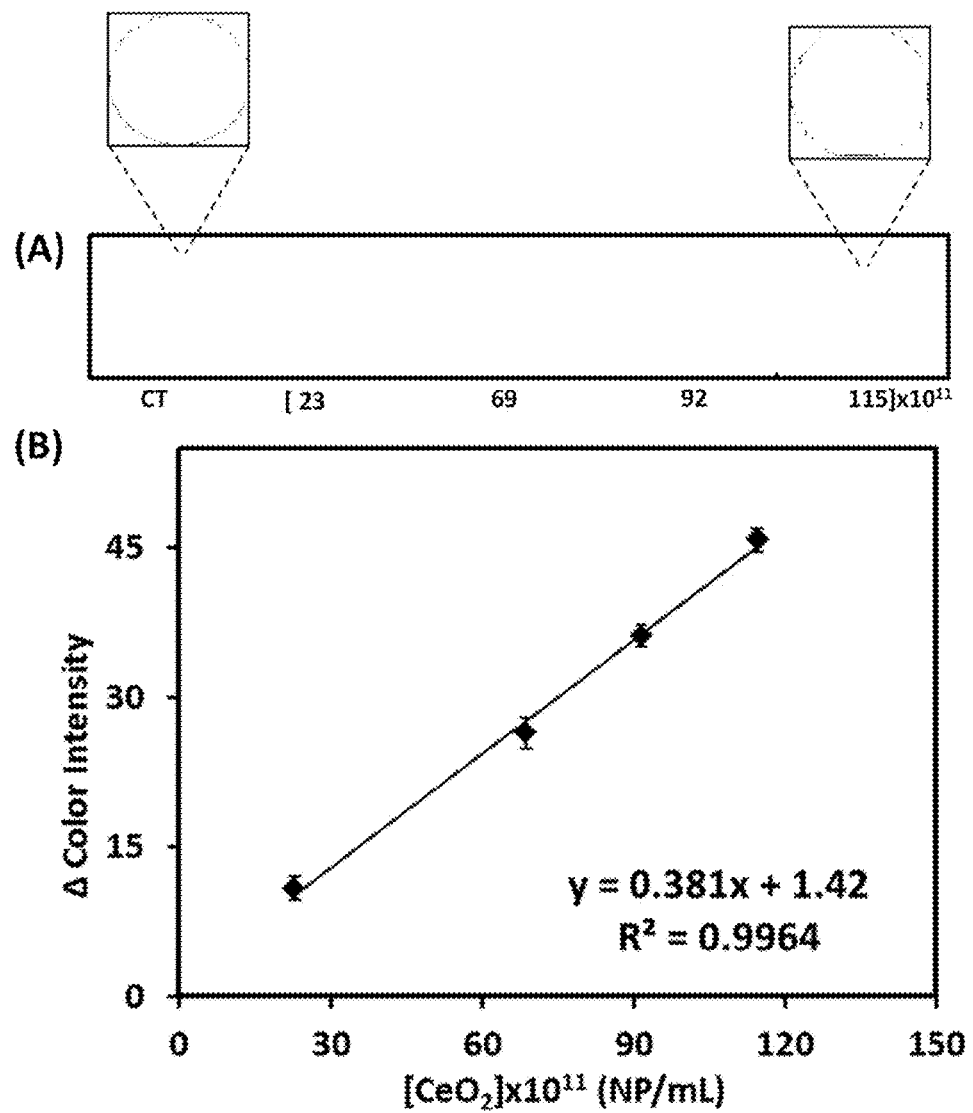
FIG. 22 shows microarray paper images of $CeO_2$ NPs, in accordance with an embodiment.

Referring to panel A of FIG. 22 are microarray paper images upon dispensing of $CeO_2$ NPs onto the catechol-grafted cotton fiber type (CHAR) platform. Expanded images of the spots of the catechol treated paper before (left panel) and after dispensing of $CeO_2$ NPs (right panel) show the characteristic color in printed sensing spot. Referring to panel B of FIG. 22 are calibration curve showing color intensity changes as a function of $CeO_2$ NPs concentration. FIG. 22 shows images of the printed sensing spots before and after dispensing the NPs. The intensity of the color of individual spots in the array increased with increasing NP concentration in the range $(23\text{-}115) \times 10^{11}$ NP/mL. The limit of detection (LOD) obtained by this method is $4.5 \times 10^{11}$ NP/mL. Comparison of performance of the three detection platforms, in solution, on paper and dot-printed is summarized in Table 4. Microarray scanners can be used in the future to improve sensitivity of measurements and improve measurement capabilities for high throughput sample analysis.

TABLE 4

Comparison of the performance characteristics of the different techniques for detection of $CeO_2$ NPs used in the study.

| Technique/ Characteristics | Linear Range (NP/mL) | LOD (NP/mL) | LOQ (NP/mL) |
|---|---|---|---|
| Spectroscopic | $(0.46\text{-}5.5) \times 10^{11}$ | $0.36 \times 10^{11}$ | $1.2 \times 10^{11}$ |
| Paper sensor | $23 \times 10^{11}$-$9.2 \times 10^{13}$ | $14.9 \times 10^{11}$ | $49.7 \times 10^{11}$ |
| XRF of paper sensor | $68.7 \times 10^{11}$-$4.6 \times 10^{13}$ | $4.7 \times 10^{11}$ | $15.7 \times 10^{11}$ |
| Microarray printing | $(23\text{-}115) \times 10^{11}$ | $4.5 \times 10^{11}$ | $15 \times 10^{11}$ |

Application to River Water and Industrial Samples.

The functionality of the ligand platform was first evaluated for detection $CeO_2$ NPs in river water collected from the local Raquette River, Potsdam, N.Y. The pH of the water sample was 7.5, while the total alkalinity (sample was titrated with 0.02 M HCl to a pH 4.5 end point, n=3) was 29.1 mg/L. The dissolved oxygen level measured using a fiber-optic oxygen meter (FireStingO2, manufactured by PyroScience) was 16.6% at 20° C. The sample was filtered using 0.2 µm syringe filter before use, and spiked with $CeO_2$ NPs ($9.2 \times 10^{12}$ NP/mL). An immediate color change was observed upon addition of the spiked sample to the catechol-modified paper. The percent recovery calculated from the calibration curves was 93.5±1.15% in good agreement with the spiked amounts of $CeO_2$ NPs.

Applicability of this platform for the measurement of $CeO_2$ NPs in slurries and wastewater originating from a laboratory-based CMP process was further evaluated. First tested was the ability of the method to differentiate slurries containing particles of different sizes ranging from 10 to 140 nm.

Figure 23:
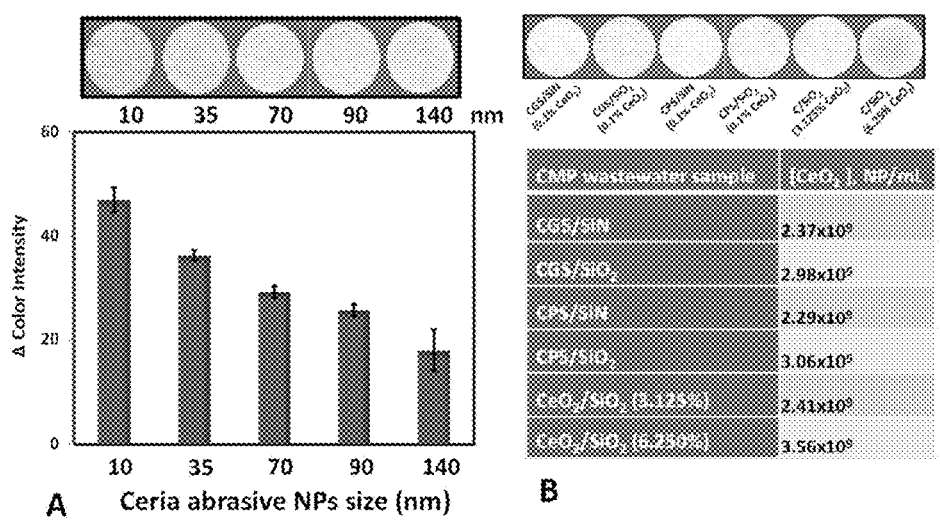
FIG. 23 shows sequestration and tracking of different sizes of $CeO_2$ NPs, in accordance with an embodiment.

Referring to panel A of FIG. 23 is shown sequestration and tracking of different sizes of $CeO_2$ NPs at 200 mg/L using responses of catechol-functionalized paper (Spectrum CFP40) membrane (from left to right: 10, 35, 70, and 90 nm aqueous dispersions of abrasives. Ceria abrasives were supplied by SLOVAY (30 wt. %), and 140 nm was supplied by Ferro Corp. (50 wt. %). Referring to panel A of FIG. 23 is the analysis of NPs in CMP wastewater samples with the respective calculated concentrations. The waste was collected from CMP polishing using slurries of varying compositions.

Figure 24:
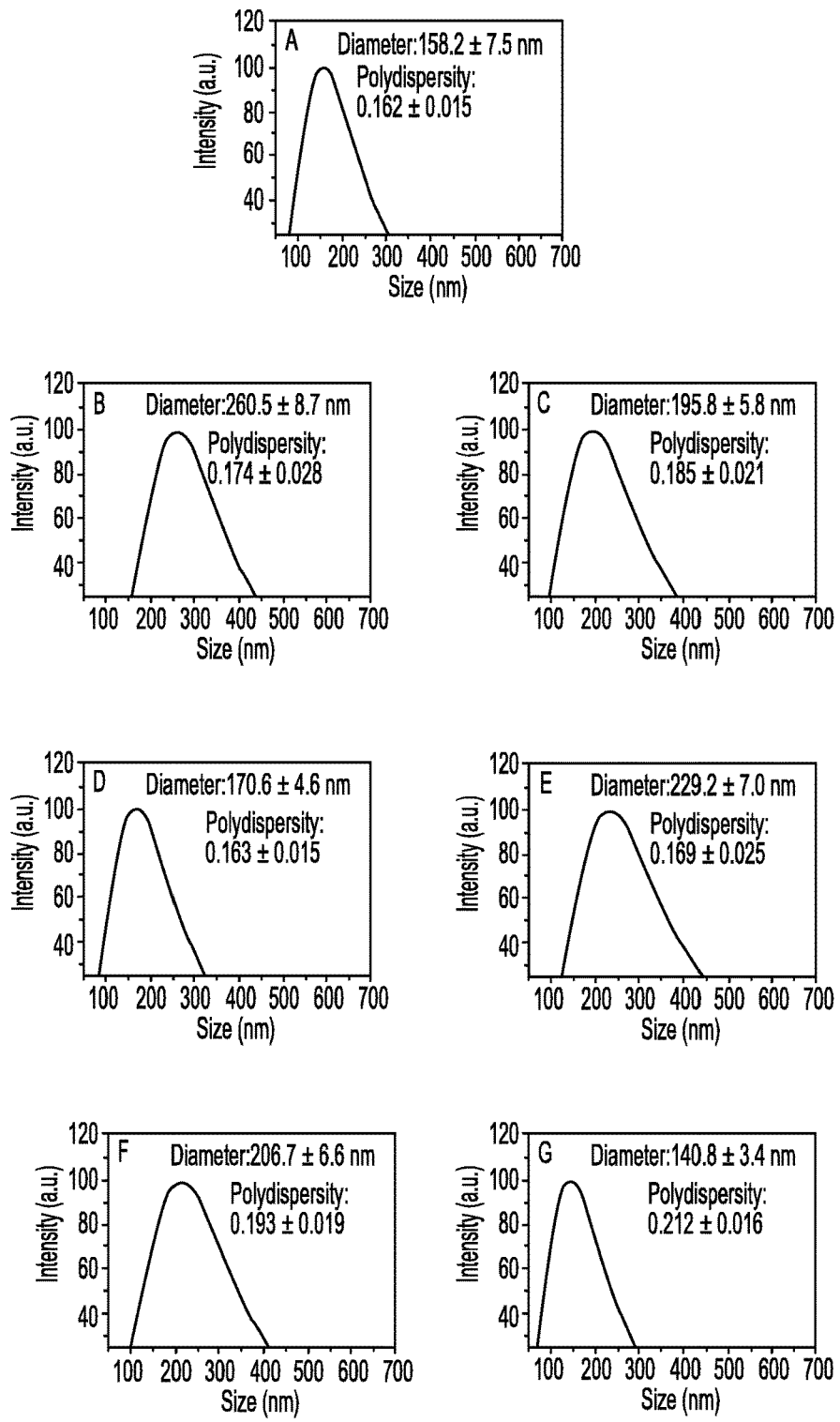
FIG. 24 shows PSD of $CeO_2$ particles, in accordance with an embodiment.

Panel A of FIG. 23 shows intensity changes obtained with five different types of commercially available ceria abrasives using the catechol-functionalized membrane. All particles provided quantifiable color changes but with varying intensity. Smaller size particles showed significantly higher response due to higher binding capacity and surface reactivity. The 140 nm particles showed the highest standard deviation, which might be due to the agglomeration and lower stability of these particles. The amount of $CeO_2$ NPs was then assessed in the wastewater collected from the polishing process with these particles. Abrasive $CeO_2$-based slurries are commonly used by the semiconducting industry as wafer polishing solutions to enhance polishing performance. Therefore, $CeO_2$ particles can be found in wastewaters from CMP polishing operations. Six different waste samples were collected from a typical CMP process as follows: CGS/SiN and CGS/$SiO_2$: 0.1 wt % ceria slurry with glycine and nicotinic acid, used for silicon nitride (SiN) and silicon oxide ($SiO_2$) wafers polishing, with measured pH values of 4.3 and 4.45, respectively; CPS/SiN and CPS/$SiO_2$: 0.1 wt % ceria slurry with proline and nicotinic acid, used for SiN and $SiO_2$, respectively, wafers polishing, with measured pH values of 3.96 and 4.74, respectively; C/$SiO_2$: 3.125 wt % and C/$SiO_2$: 6.25 wt % ceria slurry used for $SiO_2$ wafer polishing, with measured pH values of 4.80 and 4.17, respectively. The PSD of the $CeO_2$ particles in the six samples before and after polishing was first evaluated to establish the dispersity. The results are shown in FIG. 24. The PSD in the initial sample showed particles with an average size of ~160 nm. After polishing, the particles used in the slurry without additives showed a decreased average size of ~140 nm, as a result of the mechanical process. For the slurry containing additives, the average size increases due to the interaction and surface adsorption between the particles and the additives or the materials removed from the wafer surface. For all samples the polydispersity index is low (~0.2) and comparable with the initial $CeO_2$ dispersion (0.16), proving that the particles are well dispersed in the wastewater samples. The colorimetric paper sensor was then used to determine the amount of particles in each sample using the standard addition method. The colorimetric images indicate the presence of $CeO_2$ particles in all samples. Control analysis of the same sample after removal of particles by centrifugation (e.g. supernatant containing the soluble additives), showed no brownish color, demonstrating that the soluble constituents do not interfere with analysis. Additionally, the functionalized paper exposed to the sample was calcined at 400° C. for 2 hr to recover the particles and validate the results obtained with the colorimetric test. A recovery value of up to 91.7±0.02% $CeO_2$ was obtained after calcination. These results indicate that the functionalized paper can be used to track NPs in CMP wastewater, and demonstrate functionality and potential for the use of this platform in real environments. In addition to detection, this mechanism can also be used to capture and remove particles in applications that could be of interest in occupational exposure to prevent/control exposure in the workplace environment.

Materials and Methods

Materials.

Cerium(IV) oxide NPs ($CeO_2$, 10-20 nm) 20 wt. % colloidal dispersion in $H_2O$, were purchased from Alfa Aesar. Catechol (CT) and ascorbic acid (AA) were from Sigma-Aldrich. Hydrochloric acid (HCl, 37.4% assay) was purchased from Fisher Scientific. Sodium hydroxide (NaOH, pellets) was purchased from J. T. Baker. The ceria abrasives (10, 35, 70, and 90 nm, 30% colloidal) were supplied by SOLVAY while of (140 nm, 50% colloidal) was supplied by Ferro Corp, USA. Colloidal silica ($SiO_2$, 35 nm, acidic) was purchased from NYACOL nano technologies, Inc. Titanium dioxide ($TiO_2$, 10-30 nm), copper oxide nanoparticles (CuO, 40 nm), and zinc oxide (ZnO, 10-30 nm) NPs were purchased from SkySpring Nanomaterials, Inc. Iron oxide ($Fe_2O_3$, 20-40 nm), antimony oxide ($Sb_2O_3$, 80-200 nm), and zirconium oxide ($ZrO_2$, 40 nm) nanopowders were all purchased from US Research Nanomaterials, Inc., where alpha-alumina nanopowder ($Al_2O_3$, 300 nm) was purchased from SPI Metallography Supplies. All reagents were used without further purification, and all types of NPs dispersions were prepared with ultrapure water (Millipore, Direct-Q system, 18.2 MΩ·cm) and sonicated for 5 min. Two types of paper platform were used i) cellulosic type: Spectrum filter paper (Grade CFP40, 8-10 mm retention, medium flow rate), Fisher Scientific filter paper (slow flow rate, medium porosity), Whatman filter paper (2.5 μm retention, slow flow rate) and ii) cotton fiber type (acid-free charcoal—CHAR, 100% cotton).

Instrumentation.

UV-Vis spectrophotometric measurements were performed with a Schimadzu UV-2401PC spectrophotometer equipped with a 1 cm path length cell using 1.5 ml Fisherbrand methacrylate cuvettes (Fisher Sci.). Particle size distribution (PSD) and zeta potential (ζ-potential) of the colloidal solutions were measured from dynamic light scattering (DLS) measurements at 25° C. with a Brookhaven ZetaPALS analyzer (n=5). A JEOL JSM-2010 instrument was used for high resolution transmission electron microscopy (HRTEM) at an accelerating potential of 200 kV. HRTEM analysis was performed on aliquots of colloidal dispersions placed on a copper grid (Ted Pella) and dried under vacuum. Attenuated total reflectance Fourier transform infrared (ATR-FTIR) spectra for dried NP powders and ligand functionalized paper exposed to $CeO_2$ NPs were recorded using a Thermo Nicolet iS10 FT-IR Spectrometer equipped with an ATR single-reflection diamond crystal by placing the samples directly on the crystal surface. The thermogravimetric analysis (TGA) was carried out using a Seiko Exstar TG/DTA 6200 analyzer with a heating rate 20° C./min, under $N_2$ atmosphere from 30° C. to 800° C. Raman spectroscopy was performed using a Renishaw inVia Raman microscope with 2400 g/mm gratings at 514 nm Ar laser excitation. The X-ray photoelectron microscopy (XPS) measurements were carried out using a Surface Science Instruments SSX-100 with operating pressure $~2\times10^{-9}$ Torr. Monochromatic Al $K_\alpha$ X-ray (1486.6 eV) with 1 mm diameter beam size was used. Photoelectrons were collected at a 55° emission angle. A hemispherical analyzer with pass energy of 150 V for wide/survey scans, and 50 V for high resolution scans was used. A flood gun was used for charge neutralization of non-conductive samples. The surface morphology and chemical composition of the $CeO_2$ modified paper disks were evaluated by field emission scanning electron microscopy (FE-SEM) at a potential of 5 kV and energy-dispersive X-ray analysis (EDX) using a JEOL JSM-7400F instrument. To ensure conductivity, the samples were fixed on carbon tape and sputter-coated with gold (Au) and palladium (Pd) (60:40%) for 30 s under vacuum conditions. X-ray fluorescence (XRF) spectrometry measurements were carried out using a SPECTRO XEPOS energy dispersive X-ray fluorescence (ED-XRF) spectrometer (SPECTRO Analytical Instruments Inc.). The measurements were performed directly on the functionalized paper disks placed on the sample tray, for 20 minutes, with a tube working voltage of 50 kV and a current of 1 mA. The calcination studies were carried out using a Zircar (Hot Spot 110) temperature programmable furnace with a heating rate of 5° C./min followed by a steady step at 400° C. for 2 hrs. The functionalized papers were directly placed on crucibles and the difference in the weight loss between the control filter paper and the paper exposed to $CeO_2$ NPs was calculated.

Analytical Evaluation of Samples.

Analytical characterization of NP samples was performed with the ligand in solution or adsorbed on filter paper. Solution measurements to assess ligand binding and formation of change transfer complexes were carried out using UV-Vis, PSD and $\zeta$-potential analysis. The particles were also analyzed in dried state after separation from the ligand solution by centrifugation, washing (three times) and drying in a desiccator for at least 24 hrs. The dried samples were analysed using FTIR, TGA, Raman, HRTEM, XRD and XPS. The ligand-functionalized papers exposed to $CeO_2$ NPs were evaluated by FTIR, FESEM, EDX and XRF. Bare and ligand-functionalized filter papers (in absence of particles) were used as control for all experiments. The concentration values were expressed as number of NPs/mL. Calibration curves were generated with the ligand deposited on modified filter paper after addition of solutions containing different concentrations of NPs.

UV-Vis Spectroscopic Investigation.

Initial experiments were carried out to monitor changes in the optical properties of catechol of ascorbic acid solutions in the presence of $CeO_2$ NPs. An aliquot of NP dispersion at varying concentrations was added to ligand solutions, either 5 mM of catechol (pH 5.0) or ascorbic acid (pH 3.0) solution. Then, UV-Vis measurements in the absence (control, CTR) and presence of $CeO_2$ NPs were performed. The difference in the absorbance change recorded at $\lambda_{max}=460$ and 435 nm was measured as ($\Delta_{Abs}=\Delta A_{sample}-\Delta A_{CTR}$). The calibration curves were constructed by plotting the absorbance change vs $CeO_2$ NPs concentration. All measurements were performed in triplicate for at least (n=3) independently run experiments.

Fabrication and Analysis of the Functional Membrane.

To prepare the modified papers, round-cut 11 cm cellulose filter papers (8-10 mm retention, medium flow rate) were soaked in 1 M of either catechol or ascorbic acid for 15 mins, without washing and then air-dried for 2 hrs at room temperature. The resulting dried filter papers were cut into ¼ inch (0.60 cm diameter) circular discs using a paper puncher. The colorimetric measurements were carried out by applying 20 µl aliquots of colloidal dispersion of $CeO_2$ or the other metal oxides ($TiO_2$, $Fe_2O_3$, $Sb_2O_3$, ZnO, $ZrO_2$, CuO, $SiO_2$, and $Al_2O_3$) onto the functionalized paper surface. Before color analysis, the papers were let to air-dry for 1 hr to allow the formation of a stable color and complete the drying. Thereafter, to facilitate the handling and measurement of the color, they were attached to the back of a sticker and scanned in a desktop HP Scan Jet 3970 Scanner with a resolution of 1200 dot per inch (dpi). High-resolution images and light intensities were recorded as described previously. The samples were back covered with black hard paper to prevent external light interference while scanning. Control samples were analyzed using a similar procedure and under the same conditions but in the absence of NPs. In order to measure the color intensity, the images were imported into Adobe Photoshop software to analyse the RGB color channels (blue, red, and green) and obtain quantitative intensity values (0-255) in the test zones. The blue color intensity was found to be the most sensitive color analysis option as blue is the complementary color to yellow/orange/brown. The desktop scanner provides a convenient reading method and prevents variable lighting conditions that can alter reading accuracy. Alternatively, color intensity can be determined using a portable color reader such as Pantone, or a cell phone equipped with a color reader app. Average measurements of color intensity and distribution were correlated to the NPs concentration. Calibration curves were plotted using the difference in color intensity (A color intensity) before and after exposure to NPs. Three types of cellulosic membranes from different suppliers were tested (Spectrum, Fisher and Whatman) to establish variability among different types of paper.

Dot Printing Microarray.

Microarray detection spots were created using a noncontact printer device (AD1500, BioDot Inc., Irvine, Calif.) by dispersing 100 nL solutions on charcoal (CHAR, 100% cotton fiber, acid-free) paper. 1M catechol ligand solution and sample dispersions of varying NP concentrations were placed in a 96-well plate used as reservoir. The relative humidity was maintained at 50%. The microarray included 100 µm diameter spots arranged in 5×5 blocks. Samples of $CeO_2$ dispersions at concentrations in the range of $(2.3-11.4)\times10^{12}$ NP/mL were deposited on catechol treated spots. Following deposition, the paper was allowed to dry at room temperature for 1 hr and then the color intensity was analyzed using a similar procedure as in the case of cellulosic-functionalized papers.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, and/or method described herein. In addition, any combination of two or more such features, systems, articles, materials, kits, and/or methods, if such features, systems, articles, and/or methods are not mutually inconsistent, is included within the scope of the present disclosure.

What is claimed is:

1. A sensor for detecting a presence of nanoparticles, the sensor comprising:
 a non-aqueous solid platform; and
 a plurality of ligand molecules attached to the non-aqueous solid platform, wherein the ligand is selected such that binding of a nanoparticle to a ligand molecule oxidizes the ligand and produces a color change;
 wherein the color change indicates a presence of nanoparticles.

2. The sensor of claim 1, wherein the non-aqueous solid platform is a paper-based platform.

3. The sensor of claim 2, wherein the paper-based platform is cellulose.

4. The sensor of claim 1, wherein the non-aqueous solid platform comprises one or more of silk, cotton, wool, linen, nylon, rayon, and polyester.

5. The sensor of claim 1, wherein the plurality of ligand molecules comprises a catechol molecule.

6. The sensor of claim 1, wherein the plurality of ligand molecules is selected from the group consisting of caffeic acid, dopamine, and 3,4 dihydroxyphenylacetic acid.

7. The sensor of claim 1, wherein each of the plurality of ligand molecules comprises a hydroxyl functionality, and further wherein the non-aqueous solid platform is OH-rich, and the plurality of ligand molecules are attached to the platform via interaction between the hydroxyl functionality of the ligand molecules and the OH of the platform.

8. The sensor of claim 1, wherein the plurality of ligand molecules are attached to the non-aqueous solid platform by hydrogen bonding and/or charge interactions.

9. The sensor of claim 1, wherein the nanoparticles comprise a metal oxide.

10. The sensor of claim 9, wherein the metal oxide is selected from the group consisting of $CeO_2$, $SiO_2$, $Fe_2O_3$, Sb203, ZnO, $ZrO_2$, and $TiO_2$.

11. The sensor of claim 1, wherein the sensor is further configured such that the amount of color change quantifies a concentration of detected nanoparticles.

12. The sensor of claim 1, wherein the sensor is configured to detect nanoparticles in the environment.

13. The sensor of claim 1, further comprising a second plurality of ligand molecules attached to the non-aqueous solid platform, wherein the second plurality is different than the plurality of ligand molecules, and further wherein each plurality of ligand molecules is configured to selectively bind a type of nanoparticle.

14. A sensor for detecting a presence of nanoparticles, the sensor comprising:
 a wearable item comprising a plurality of threads; and
 a plurality of ligand molecules attached to at least some of the plurality of threads, wherein the ligand is selected such that binding of a nanoparticle to a ligand molecule oxidizes the ligand and produces a color change;
 wherein a color change indicates a presence of nanoparticles.

15. The sensor of claim 14, wherein the plurality of ligand molecules comprises a catechol molecule.

16. The sensor of claim 14, wherein the plurality of ligand molecules is selected from the group consisting of caffeic acid, ascorbic acid, dopamine, gallic acid, and 3,4 dihydroxyphenylacetic acid.

17. The sensor of claim 14, wherein the nanoparticles comprise a metal oxide.

18. The sensor of claim 17, wherein the metal oxide is selected from the group consisting of $CeO_2$, $SiO_2$, $Fe_2O_3$, Sb203, ZnO, $ZrO_2$, and $TiO_2$.

19. A system for selectively filtering nanoparticles, the system comprising:
 a wearable item comprising a plurality of threads; and
 a plurality of ligand molecules attached to at least some of the plurality of threads, wherein the ligand is selected such that binding of a nanoparticle to a ligand molecule oxidizes the ligand and produces a color change;
 wherein a color change indicates a presence of nanoparticles.

20. The system of claim 17, wherein the plurality of threads comprise one or more of silk, cotton, wool, linen, nylon, rayon, and polyester.

21. A system for capturing and removing nanoparticles from a surface, the system comprising a fabric platform modified with: (i) a ligand having o-dihydroxy functionalities; (ii) ascorbic acid; and/or (iii) catechol;
 wherein the fabric platform is configured such that wiping the surface with the platform binds nanoparticles on the surface to the modified fabric via the ascorbic acid or catechol.

22. A disposable respiratory protective mask configured to minimize a worker's exposure to environmental nanoparticles, the mask comprising a platform modified with: (i) a ligand having o-dihydroxy functionalities; (ii) ascorbic acid; and/or (iii) catechol;
 wherein the platform is configured such that exposure to environmental nanoparticles causes the nanoparticles to bind to the modified platform via the ascorbic acid or catechol.

* * * * *